US 8,341,084 B2

(12) United States Patent
Cowen

(10) Patent No.: US 8,341,084 B2
(45) Date of Patent: Dec. 25, 2012

(54) METHOD, APPARATUS, AND COMPUTER PROGRAM PRODUCT FOR TOPPING UP PREPAID PAYMENT CARDS FOR OFFLINE USE

(75) Inventor: Michael J. Cowen, London (GB)

(73) Assignee: Mastercard International Incorporated, Purchase, NY (US)

( * ) Notice: Subject to any disclaimer, the term of this patent is extended or adjusted under 35 U.S.C. 154(b) by 602 days.

(21) Appl. No.: 12/480,060

(22) Filed: Jun. 8, 2009

(65) Prior Publication Data
US 2010/0312617 A1    Dec. 9, 2010

(51) Int. Cl.
    *G06Q 40/00* (2006.01)
(52) U.S. Cl. .......... 705/41; 235/379; 235/380; 235/383; 705/16; 705/44; 705/64; 705/71
(58) Field of Classification Search ........................ None
    See application file for complete search history.

(56) References Cited

U.S. PATENT DOCUMENTS

| | | | |
|---|---|---|---|
| 3,594,727 A * | 7/1971 | Braun | 235/379 |
| 4,114,027 A | 9/1978 | Slater et al. | |
| 4,630,201 A | 12/1986 | White | |
| 4,634,147 A | 1/1987 | McClure | |
| 4,736,094 A | 4/1988 | Yoshida | |
| 4,804,825 A | 2/1989 | Bitoh | |
| 4,849,613 A | 7/1989 | Eisele | |
| 4,891,503 A * | 1/1990 | Jewell | 235/380 |
| 5,055,657 A | 10/1991 | Miller et al. | |
| 5,285,382 A | 2/1994 | Muehleberger et al. | |
| 5,384,449 A | 1/1995 | Pierce | |
| 5,485,510 A | 1/1996 | Colbert | |
| 5,577,121 A | 11/1996 | Davis et al. | |
| 5,650,606 A | 7/1997 | Baus, Jr. | |
| 5,679,938 A | 10/1997 | Templeton et al. | |

(Continued)

FOREIGN PATENT DOCUMENTS
EP    0945833 A2    9/1999
(Continued)

OTHER PUBLICATIONS

Verdon, Joan. Gift Cards Are Hot Sellers for Christmas. The Record, Hackensack, N.J. Knight Rider/Tribune Business News. Dec. 26, 2003.*

(Continued)

*Primary Examiner* — Robert Niquette
(74) *Attorney, Agent, or Firm* — Otterstedt, Ellenbogen & Kammer, LLP

(57) ABSTRACT

A card holder carries out an initial top-up of a balance of a pre-paid payment card. The prepaid payment card is configured for use in an infrastructure in accordance with a payment specification requiring different behavior for normal transactions in the infrastructure versus that required for topping-up of the balance. Contemporaneously with the initial top-up, the card holder registers risk mitigation information in association with the pre-paid payment card. Subsequent to the initial top-up, an indicator is written to the pre-paid payment card during a transaction with the pre-paid payment card outside the infrastructure. The indicator identifies the pre-paid payment card as having the risk mitigation information associated therewith. During subsequent presentation of the pre-paid payment card to the infrastructure, the pre-paid payment card is treated as a token backed up by the risk mitigation information, based on presence of the indicator on the pre-paid payment card.

34 Claims, 7 Drawing Sheets

U.S. PATENT DOCUMENTS

| | | | |
|---|---|---|---|
| 5,744,787 A | 4/1998 | Teicher | |
| 5,793,027 A | 8/1998 | Baik | |
| 5,828,044 A | 10/1998 | Jun et al. | |
| 5,917,913 A | 6/1999 | Wang | |
| 5,987,438 A | 11/1999 | Nakano et al. | |
| 5,999,919 A | 12/1999 | Jarecki et al. | |
| 6,018,717 A | 1/2000 | Lee et al. | |
| 6,023,682 A | 2/2000 | Checchio | |
| 6,032,135 A | 2/2000 | Molano et al. | |
| 6,038,552 A | 3/2000 | Fleischl et al. | |
| 6,064,988 A | 5/2000 | Thomas | |
| 6,070,795 A | 6/2000 | Feiken | |
| 6,078,888 A | 6/2000 | Johnson, Jr. | |
| 6,123,223 A | 9/2000 | Watkins | |
| 6,182,894 B1 | 2/2001 | Hackett et al. | |
| 6,422,460 B1 | 7/2002 | Boesch | |
| 6,546,373 B1 | 4/2003 | Cerra | |
| 6,554,183 B1 | 4/2003 | Sticha et al. | |
| 6,634,549 B1 | 10/2003 | Matsumoto et al. | |
| 6,651,885 B1 | 11/2003 | Arias | |
| 6,675,153 B1 | 1/2004 | Cook et al. | |
| 6,749,114 B2 | 6/2004 | Madani | |
| 6,793,135 B1 * | 9/2004 | Ryoo | 235/383 |
| 6,848,613 B2 | 2/2005 | Nielson et al. | |
| 6,850,916 B1 | 2/2005 | Wang | |
| 6,853,987 B1 | 2/2005 | Cook | |
| 6,923,371 B2 | 8/2005 | Goodfellow | |
| 6,931,382 B2 | 8/2005 | Laage et al. | |
| 6,934,849 B2 | 8/2005 | Kramer et al. | |
| 6,999,944 B1 | 2/2006 | Cook | |
| 7,003,495 B1 | 2/2006 | Burger et al. | |
| 7,010,512 B1 | 3/2006 | Gillin et al. | |
| 7,021,532 B2 | 4/2006 | Robinson et al. | |
| 7,039,611 B2 | 5/2006 | Devine | |
| 7,216,105 B2 | 5/2007 | Adamson | |
| 2001/0029494 A1 | 10/2001 | Tomita | |
| 2002/0032661 A1 | 3/2002 | Schuba et al. | |
| 2002/0046092 A1 | 4/2002 | Ostroff | |
| 2002/0074401 A1 | 6/2002 | Madani | |
| 2002/0111909 A1 | 8/2002 | Lee | |
| 2002/0124184 A1 | 9/2002 | Fichadia et al. | |
| 2002/0138445 A1 | 9/2002 | Laage et al. | |
| 2002/0156745 A1 | 10/2002 | Tallent et al. | |
| 2002/0170959 A1 | 11/2002 | Madani | |
| 2003/0055786 A1 | 3/2003 | Smith, Jr. et al. | |
| 2003/0061163 A1 | 3/2003 | Durfield | |
| 2003/0074317 A1 | 4/2003 | Hofi | |
| 2003/0080186 A1 | 5/2003 | McDonald et al. | |
| 2003/0097402 A1 | 5/2003 | Vindeby | |
| 2003/0101137 A1 * | 5/2003 | Wronski, Jr. | 705/44 |
| 2003/0163424 A1 | 8/2003 | Kumamoto | |
| 2003/0212796 A1 | 11/2003 | Willard | |
| 2003/0236755 A1 | 12/2003 | Dagelet, Jr. | |
| 2004/0006536 A1 | 1/2004 | Kawashima et al. | |
| 2004/0039694 A1 | 2/2004 | Dunn et al. | |
| 2004/0128258 A1 | 7/2004 | Su | |
| 2004/0230535 A1 * | 11/2004 | Binder et al. | 705/64 |
| 2004/0238620 A1 | 12/2004 | Cohagan et al. | |
| 2004/0243510 A1 | 12/2004 | Hinderer et al. | |
| 2004/0254892 A1 | 12/2004 | Adamson | |
| 2005/0033688 A1 | 2/2005 | Peart et al. | |
| 2005/0044039 A1 | 2/2005 | Greer et al. | |
| 2005/0116026 A1 | 6/2005 | Burger et al. | |
| 2005/0131826 A1 | 6/2005 | Cook | |
| 2005/0149455 A1 * | 7/2005 | Bruesewitz et al. | 705/64 |
| 2005/0184145 A1 * | 8/2005 | Law et al. | 235/380 |
| 2005/0238149 A1 | 10/2005 | DeLeon | |
| 2005/0262026 A1 | 11/2005 | Watkins | |
| 2005/0269398 A1 | 12/2005 | Robinson et al. | |
| 2006/0031161 A1 | 2/2006 | D'Agostino | |
| 2007/0011089 A1 | 1/2007 | DeSchryver | |
| 2007/0130087 A1 | 6/2007 | Adamson | |
| 2007/0131761 A1 | 6/2007 | Smets et al. | |
| 2007/0168260 A1 | 7/2007 | Cunescu et al. | |
| 2007/0215697 A1 | 9/2007 | Ward et al. | |
| 2007/0255657 A1 * | 11/2007 | Brown | 705/41 |
| 2007/0262139 A1 | 11/2007 | Fiebiger et al. | |
| 2007/0271101 A1 | 11/2007 | Kubota | |
| 2008/0033880 A1 * | 2/2008 | Fiebiger et al. | 705/44 |
| 2008/0049940 A1 | 2/2008 | Kocher | |
| 2008/0091543 A1 * | 4/2008 | McGee et al. | 705/16 |
| 2008/0147552 A1 | 6/2008 | Morsillo et al. | |
| 2008/0156873 A1 | 7/2008 | Wilhelm et al. | |
| 2008/0222039 A1 * | 9/2008 | Gutierrez-Sheris | 705/44 |
| 2009/0150295 A1 * | 6/2009 | Hatch et al. | 705/71 |
| 2009/0204525 A1 | 8/2009 | Phillips | |
| 2009/0254484 A1 | 10/2009 | Forero et al. | |
| 2010/0036741 A1 | 2/2010 | Cleven | |
| 2010/0153267 A1 * | 6/2010 | Ghaidan et al. | 705/41 |

FOREIGN PATENT DOCUMENTS

| | | |
|---|---|---|
| JP | 54149444 | 11/1979 |
| WO | WO 02084569 A1 | 10/2002 |
| WO | WO 2006/124808 A2 | 11/2006 |
| WO | WO 2006/124808 A3 | 11/2006 |
| WO | WO 2010/033476 * | 3/2010 |
| WO | WO2011033476 A1 | 9/2011 |

OTHER PUBLICATIONS

Irwin, Timothy et al. Managing Government Exposure to Private Infrastructure Risks. The World Bank Observer. vol. 14, No. 2 (Aug. 1999), pp. 229-245. © 1999.*

Transport for London, London, England, Get the most from Oyster, A user's guide, Jan. 2009, pp. 1-11.

EMV Integrated Circuit Card, Specifications for Payment Systems, Book 3, Application Specification, Version 4.2, Jun. 2008, EMVCO, LLC, Foster City, CA pp. i-xiv.

EMV Integrated Circuit Card, Specifications for Payment Systems, Book 4, Cardholder, Attendant, and Acquirer Interface Requirements, Version 4.2 Jun. 2008, EMVCO, LLC, Foster City, CA pp. i-xii, 106-107.

Klaus Finkenzeller, Fundamental Operating Principles, from RFID Handbook: Fundamentals and Applications in Contactless Smart Cards and Identification, copyright 2003 John Wiley & Sons Ltd ISBN: 0-470-84402-7.

Understanding the Requirements of ISO/IEC 14443 for Type B Proximity Contactless Identification Cards, ATMEL publication, Rev. 2056A-RFID—Aug. 2002.

Identification Cards—Contactless Integrated Circuit(s) Cards—Proximity Cards, from International Standard copyright ISO/IEC FCD 14443-1 ISO/IEC JTC1/SC17 N 1363. Final Committee Draft Part 1: Physical Characteristics.

Cutting EdgeTechnology for ePurse Cards, downloaded from http://www.gi-de.com/portal/page?_pageid=42,54782&_dad=portal&_schema=PORTAL, Aug. 24, 2005.

Star Debit/Credit—The Secure Solution for your Chip Migration, downloaded from http://www.gi-de.com/portal/page?_pageid=42,54776&_dad=portal&_schema=PORTAL, Aug. 24, 2005.

Octopus Cards Limited, Hong Kong, S.A.R., P.R. China, Octopus—Consumer—AAVS, Reload your Octopus, http://www.octopuscards.com/consumer/payment/reload/en/aavs.jsp, Jul. 29, 2009, pp. 1-2.

U.S. Appl. No. 12/368,394, filed Feb. 10, 2009, titled, Method and Apparatus for Simplifying the Handling of Complex Payment Transactions.

PCT ISR and Written Opinion, PCT/US10/58330, Mar. 28, 2011.

PCT ISR, PCT/US09/56902, Nov. 5, 2009.

PCT Written Opinion, PCT/US09/56902, Nov. 5, 2009.

* cited by examiner

METHOD, APPARATUS, AND COMPUTER PROGRAM PRODUCT FOR TOPPING UP PREPAID PAYMENT CARDS FOR OFFLINE USE

FIELD OF THE INVENTION

The present invention relates generally to electronic commerce, and, more particularly, to electronic payment systems.

BACKGROUND OF THE INVENTION

There is an interest in employing cash alternatives in a variety of environments. Such cash alternatives can include, for example, payment devices such as payment cards and the like. Cash alternatives are sometimes used within an infrastructure, such as a transit infrastructure (e.g., subway, metro, or underground; bus system). In some such applications, a top-up transaction requires a change in behavior, as compared to a normal transaction. For example, the person might normally perform a simple "tap and go" transaction (i.e., present the card or other payment device in a contactless manner) to travel on a transit system, but when the time came that a top-up was required, the person might need to go to a kiosk or other location in order to carry out that transaction.

SUMMARY OF THE INVENTION

Principles of the present invention provide techniques for topping up prepaid payment cards for offline use. An exemplary embodiment of a method, according to one aspect of the invention, includes the step of facilitating a card holder carrying out an initial top-up of a balance of a pre-paid payment card. The prepaid payment card is configured for use in an infrastructure in accordance with a payment specification requiring different behavior for normal payment transactions in the infrastructure versus that required for topping-up of the balance. Contemporaneously with the initial top-up, an additional step includes facilitating the card holder registering risk mitigation information in association with the pre-paid payment card. A further step includes, subsequent to the initial top-up, facilitating writing an indicator to the pre-paid payment card during a transaction with the pre-paid payment card at a different type of terminal which might be in a different environment. The indicator identifies the pre-paid payment card as having the risk mitigation information associated therewith. A still further step includes, during subsequent presentation of the pre-paid payment card to the infrastructure, treating the pre-paid payment card as a token backed up by the risk mitigation information, based on presence of the indicator on the pre-paid payment card.

One or more embodiments of the invention or elements thereof can be implemented in the form of a computer product including a tangible computer readable recordable storage medium with computer usable program code for performing the method steps indicated. Furthermore, one or more embodiments of the invention or elements thereof can be implemented in the form of a system (or apparatus) including a memory and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s), or (iii) a combination of hardware and software modules; any of (i)-(iii) implement the specific techniques set forth herein, and the software modules are stored in a tangible computer-readable recordable storage medium (or multiple such media).

One or more embodiments of the invention can provide substantial beneficial technical effects; for example minimizing the requirements of, and impact upon, the acceptance infrastructure required to support the desired functionality; as well as taking advantage of existing infrastructure (e.g. the retail payments infrastructure) to carry out operations that would otherwise require new functionality within a transit system or the like (for example, to load an indicator onto the pre-paid payment card that tells a transit reader that direct payment need not be taken from the pre-paid payment card, and that such pre-paid payment card can be treated as a credit or debit card and the payment processed in the back office).

These and other features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
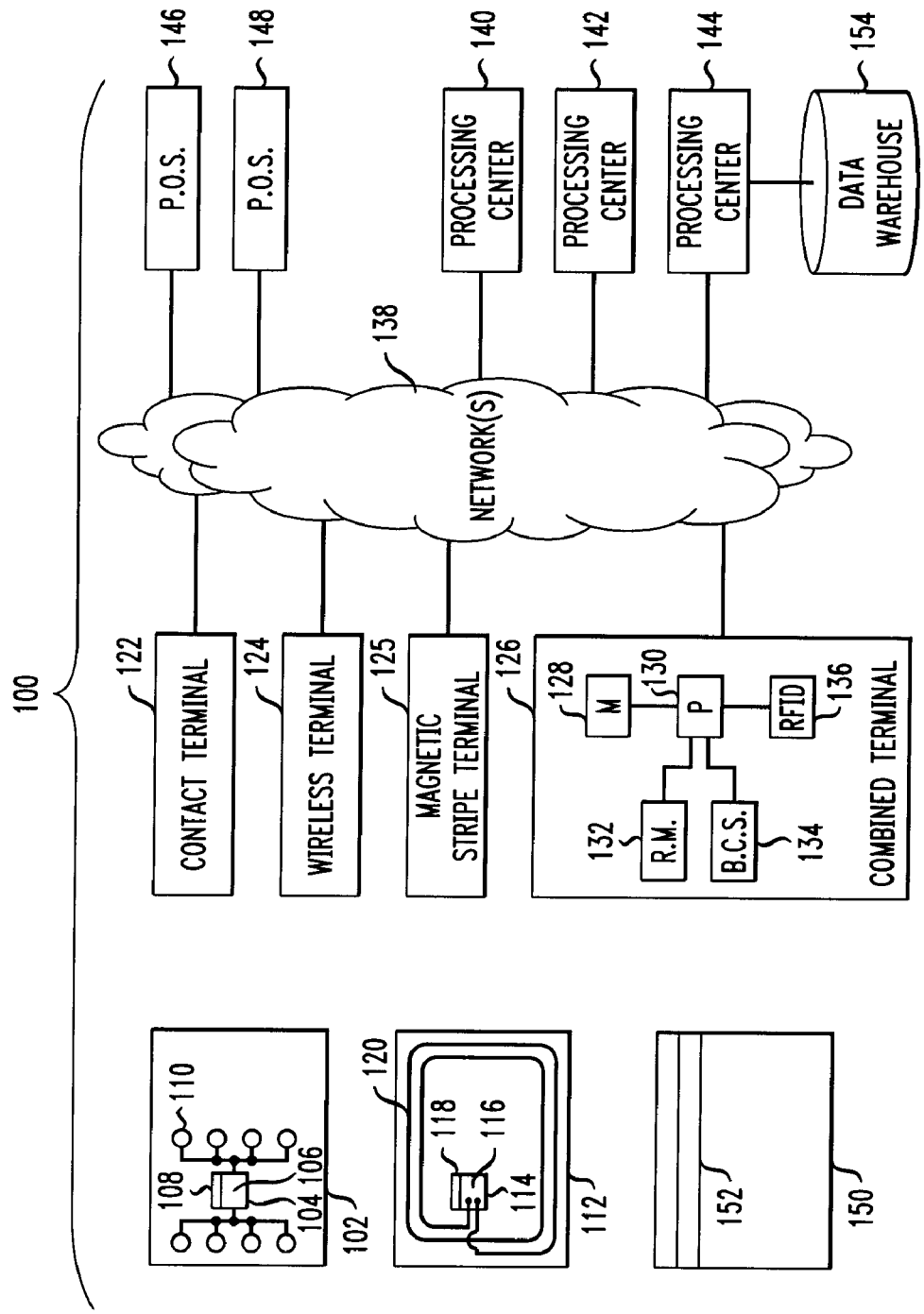
FIG. 1 shows an example of a system that can implement techniques of the present invention.

Attention should initially be given to FIG. 1, which depicts an exemplary embodiment of a system 100, according to an aspect of the present invention, and including various possible components of the system. System 100 can include one or more different types of portable payment devices. For example, one such device can be a contact device such as card 102. Card 102 can include an integrated circuit (IC) chip 104 having a processor portion 106 and a memory portion 108. A plurality of electrical contacts 110 can be provided for communication purposes. In addition to or instead of card 102, system 100 can also be designed to work with a contactless device such as card 112. Card 112 can include an IC chip 114 having a processor portion 116 and a memory portion 118. An antenna 120 can be provided for contactless communication, such as, for example, using radio frequency (RF) electromagnetic waves. An oscillator or oscillators, and/or additional appropriate circuitry for one or more of modulation, demodulation, downconversion, and the like can be provided. Note that cards 102, 112 are exemplary of a variety of devices that can be employed with techniques of the invention. Other types of devices could include a conventional card 150 having a magnetic stripe 152, an appropriately configured cellular telephone handset, and the like. Indeed, techniques of the invention can be adapted to a variety of different types of cards, terminals, and other devices.

The ICs 104, 114 can contain processing units 106, 116 and memory units 108, 118. Preferably, the ICs 104, 114 can also include one or more of control logic, a timer, and input/output ports. Such elements are well known in the IC art and are not separately illustrated. One or both of the ICs 104, 114 can also include a co-processor, again, well-known and not separately illustrated. The control logic can provide, in conjunction with processing units 106, 116, the control necessary to handle communications between memory unit 108, 118 and the input/output ports. The timer can provide a timing reference signal from processing units 106, 116 and the control logic. The co-processor could provide the ability to perform complex computations in real time, such as those required by cryptographic techniques.

The memory portions or units 108, 118 may include different types of memory, such as volatile and non-volatile memory and read-only and programmable memory. The memory units can store transaction card data such as, e.g., a user's primary account number ("PAN") and/or personal identification number ("PIN"). The memory portions or units 108, 118 can store the operating system of the cards 102, 112. The operating system loads and executes applications and provides file management or other basic card services to the applications. One operating system that can be used to implement the present invention is the MULTOS® operating system licensed by MAOSCO Limited. (MAOSCO Limited, St. Andrews House, The Links, Kelvin Close, Birchwood, Warrington, WA3 7PB, United Kingdom) Alternatively, JAVA CARD™-based operating systems, based on JAVA CARD™ technology (licensed by Sun Microsystems, Inc., 4150 Network Circle, Santa Clara, Calif. 95054 USA), or proprietary operating systems available from a number of vendors, could be employed. Preferably, the operating system is stored in read-only memory ("ROM") within memory portion 108, 118. In an alternate embodiment, flash memory or other non-volatile and/or volatile types of memory may also be used in the memory units 108, 118.

In addition to the basic services provided by the operating system, memory portions 108, 118 may also include one or more applications. At present, one possible specification to which such applications may conform is the EMV interoperable payments specification set forth by EMVCo, LLC (http://www.emvco.com). It will be appreciated that, strictly speaking, the EMV specification defines the behavior of a terminal; however, the card can be configured to conform to such EMV-compliant terminal behavior and in this sense is itself EMV-compliant. It will also be appreciated that applications in accordance with the present invention can be configured in a variety of different ways.

As noted, cards 102, 112 are examples of a variety of payment devices that can be employed with techniques of the present invention. The primary function of the payment devices may not be payment, for example, they may be cellular phone handsets that implement techniques of the invention. Such devices could include cards having a conventional form factor, smaller or larger cards, cards of different shape, key fobs, personal digital assistants (PDAs), appropriately configured cell phone handsets, or indeed any device with the capabilities to implement techniques of the invention. The cards, or other payment devices, can include body portions (e.g., laminated plastic layers of a payment card, case or cabinet of a PDA, chip packaging, and the like), memories 108, 118 associated with the body portions, and processors 106, 116 associated with the body portions and coupled to the memories. The memories 108, 118 can contain appropriate applications. The processors 106, 116 can be operative to facilitate execution of one or more method steps. The applications can be, for example, application identifiers (AIDs) linked to software code in the form of firmware plus data in a card memory such as an electrically erasable programmable read-only memory (EEPROM). Again, note that "smart" cards are not necessarily required and a magnetic stripe (or other technology) card can be employed, as discussed below, as long as a suitable indicator can be written to the card or other payment device. Furthermore, cards or other devices could have a single interface (e.g., contacted, contactless, or magnetic stripe), or more than one interface (for example, both contacted and contactless). One or more embodiments of the invention are particularly beneficial where a card or other device has different behaviors for normal use and topping up, whether the different behaviors occur with different interfaces or the same interface.

A number of different types of terminals can be employed with system 100. Such terminals can include a contact terminal 122 configured to interface with contact-type device 102, a wireless terminal 124 configured to interface with wireless device 112, a magnetic stripe terminal 125 configured to interface with a magnetic stripe device 150, or a combined terminal 126. Combined terminal 126 is designed to interface with any type of device 102, 112, 150. Some terminals can be contact terminals with plug-in contactless readers. Combined terminal 126 can include a memory 128, a processor portion 130, a reader module 132, and optionally an item interface module such as a bar code scanner 134 and/or a radio frequency identification (RFID) tag reader 136. Items 128, 132, 134, 136 can be coupled to the processor 130. Note that the principles of construction of terminal 126 are applicable to other types of terminals and are described in detail for illustrative purposes. Reader module 132 can be configured for contact communication with card or device 102, contactless communication with card or device 112, reading of magnetic stripe 152, or a combination of any two or more of the foregoing (different types of readers can be provided to interact with different types of cards e.g., contacted, magnetic stripe, or contactless). Terminals 122, 124, 125, 126 can be connected to one or more processing centers 140, 142, 144 via a computer network 138. Network 138 could include, for example, the Internet, or a proprietary network. More than one network could be employed to connect different elements of the system. Processing centers 140, 142, 144 can include, for example, a host computer of an issuer of a payment device. Further details regarding one specific form of network will be provided below.

Many different retail or other establishments, represented by points-of-sale 146, 148, can be connected to network 138. In one or more embodiments of the invention, it is believed preferable that various establishments interface with a telecommunications network, such as a virtual private network (VPN), via one or more machines which are then connected to the network. This will be discussed further below. Each such establishment can have one or more terminals. Further, different types of portable payment devices, terminals, or other elements or components can combine or "mix and match" one or more features depicted on the exemplary devices in FIG. 1.

Portable payment devices can facilitate transactions by a user with a terminal, such as 122, 124, 125, 126, of a system such as system 100. Such a device can include a processor, for example, the processing units 106, 116 discussed above. The device can also include a memory, such as memory portions 108, 118 discussed above, that is coupled to the processor. Further, the device can include a communications module that is coupled to the processor and configured to interface with a terminal such as one of the terminals 122, 124, 125, 126. The communications module can include, for example, the contacts 110 or antennas 120 together with appropriate circuitry (such as the aforementioned oscillator or oscillators and related circuitry) that permits interfacing with the terminals via contact or wireless communication. The processor of the apparatus can be operable to perform one or more steps of appropriate methods and techniques. The processor can perform such operations via hardware techniques, and/or under the influence of program instructions, such as an application, stored in one of the memory units.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed.

The portable device can include a body portion. For example, this could be a laminated plastic body (as discussed above) in the case of "smart" cards 102, 112, or the handset chassis and body in the case of a cellular telephone.

It will be appreciated that the terminals 122, 124, 125, 126 are examples of terminal apparatuses for interacting with a payment device of a holder in accordance with one or more exemplary embodiments of the invention. The apparatus can include a processor such as processor 130, a memory such as memory 128 that is coupled to the processor, and a communications module such as 132 that is coupled to the processor and configured to interface with the portable apparatuses 102, 112, 142. The processor 130 can be operable to communicate with portable payment devices of a user via the communications module 132. The terminal apparatuses can function via hardware techniques in processor 130, or by program instructions stored in memory 128. Such logic could optionally be provided from a central location such as processing center 140 over network 138. In some instances, the aforementioned bar code scanner 134 and/or RFID tag reader 136 can be provided, and can be coupled to the processor, to gather attribute data, such as a product identification, from a UPC code or RFID tag on a product to be purchased. In some environments, such as, by way of example and not limitation, a transit system with a fixed fare (or a fare that depends on factors such as the length of the ride), items 134 and 136 are not needed, since, e.g., only one item can be purchased (the fixed-fare ride), identification can occur via other means, or the fare amount depends on the length of the trip rather than a specific product identification.

The above-described devices 102, 112 can be ISO 7816-compliant contact cards or devices or ISO 14443-compliant proximity cards or devices. In operation, card 112 can be touched or tapped on the terminal 124 or 128, which then contactlessly transmits the electronic data to the proximity IC chip in the card 112 or other wireless device. Magnetic stripe cards can be swiped in a well-known manner.

One or more of the processing centers 140, 142, 144 can include a database such as a data warehouse 154 for storing information of interest.

Figure 2:
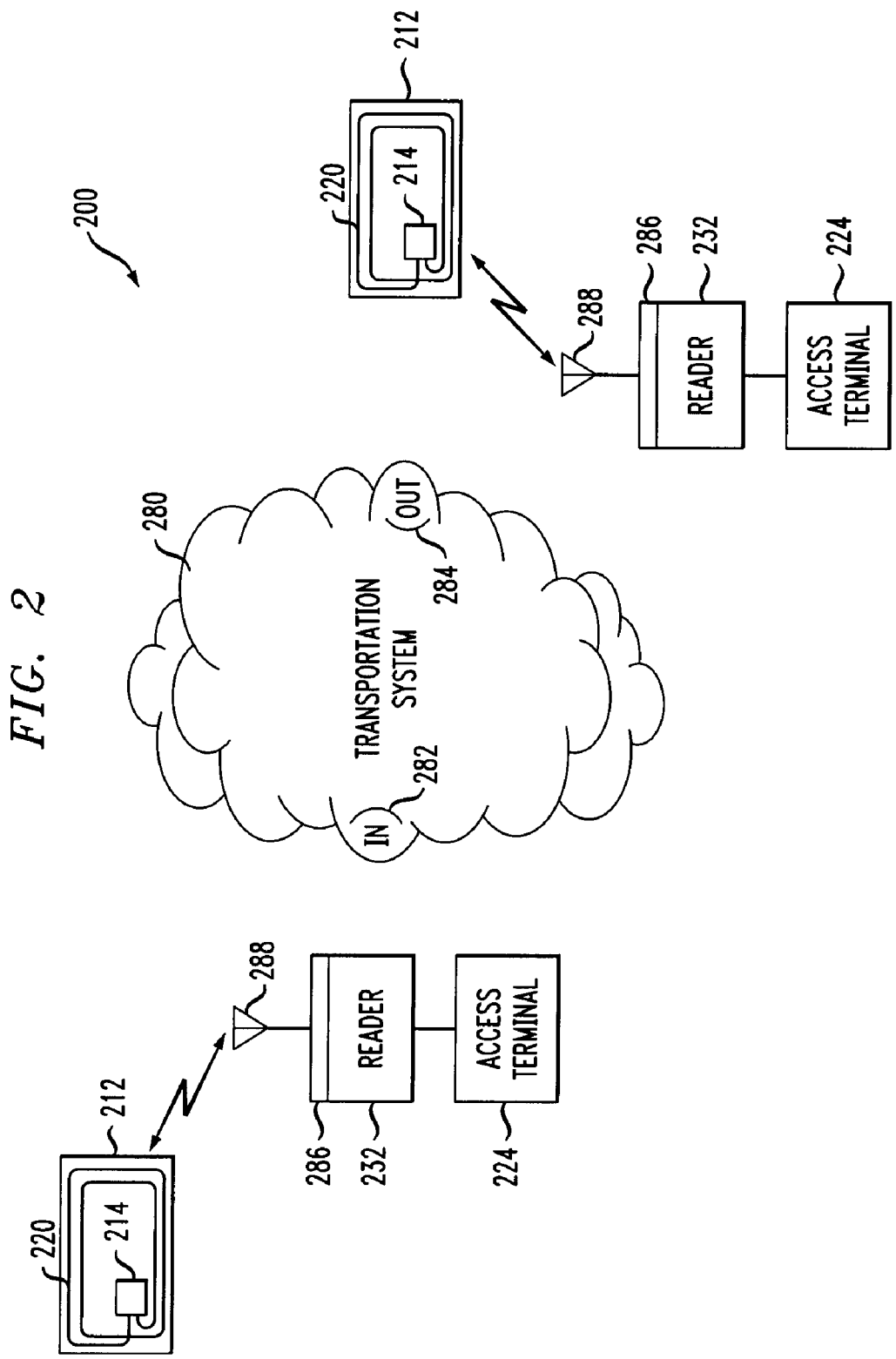
FIG. 2 shows one specific non-limiting exemplary application of techniques of the present invention to a transportation system.

Attention should now be given to FIG. 2, which depicts an exemplary system 200 applying certain techniques of the invention to an exemplary transportation system 280. It is to be understood that this is illustrative of one of many possible applications of techniques of the present invention. Passenger access to system 280 is controlled by portable payment devices 212 and terminals 224. Elements in FIG. 2 similar to those in FIG. 1 have received the same reference character incremented by 100 and will not be described in detail again. Thus, devices 212, chips 214, antennas 220, terminals 224 and reader modules 232 are similar to those discussed above with respect to FIG. 1. The reader modules can include communications circuitry 286 and antennas 288 for wireless communications with antennas 220. Contact or magnetic stripe solutions could also be employed, in addition to or in lieu of contactless solutions.

When a passenger wishes to enter system 280, he or she causes device 212 to communicate with access terminal 224 (for example by touching or tapping at a designated location, or holding in close proximity to such location). As used herein, "communicate with" is intended to cover both one and two-way cases, for example, a two-way communication scenario with a terminal and chip card, as well as a one-way scenario wherein a terminal simply reads a magnetic stripe card. The touching, tapping, or other communication may result, for example, in recordation of the passenger's activity to enable subsequent calculation of a fare owed. A turnstile or other entrance barrier may then permit passage through entrance 282 to trains or other modes of transportation. In some cases, a passenger must again present device 212 when exiting at exit 284, as a fare may depend on a distance traveled.

Embodiments of the invention also contemplate additional method steps of opening a fare gate (for example, allowing a turnstile to turn) when appropriate; for example, when the card or other device is presented upon exit and/or entrance.

It should be noted at this point that the complete disclosures of the following United States patent application Publications are expressly incorporated herein by reference in their entireties for all purposes:

US 2007/026139 of Fiebiger et al., published 15 Nov. 2007, and entitled "Techniques for Authorization of Usage of a Payment Device"

US 2008/0033880 of Fiebiger et al., published 7 Feb. 2008, and entitled "Techniques for Authorization of Usage of a Payment Device"

US 2008/0156873 of Wilhelm et al., published Jul. 3, 2008, and entitled "Method And System For Using Contactless Payment Cards In A Transit System"

Note that aspects of the above-referenced United States patent application Publications are pertinent to high-speed server-based decisioning as well as aggregation and subsequent processing of the transaction. However, one or more embodiments of the invention relate to offline terminal decisioning, such that the high-speed server-based decisioning aspects of the references may not be particularly pertinent, whereas the aggregation and subsequent fare calculation and payment processing techniques of the references are of interest to some embodiments of the invention.

Furthermore, the complete disclosure of the following U.S. patent application is expressly incorporated herein by reference in its entirety for all purposes: Ser. No. 12/368,394 of Michael J. Cowen, filed 10 Feb. 2009 and entitled "Method and Apparatus for Simplifying the Handling of Complex Payment Transactions." The ISO 8583 Standard for Financial Transaction Card Originated Messages—Interchange message specifications, the International Organization for Standardization standard for systems that exchange electronic transactions made by cardholders using payment cards, is also expressly incorporated herein by reference for all purposes in its entirety.

Figure 3:
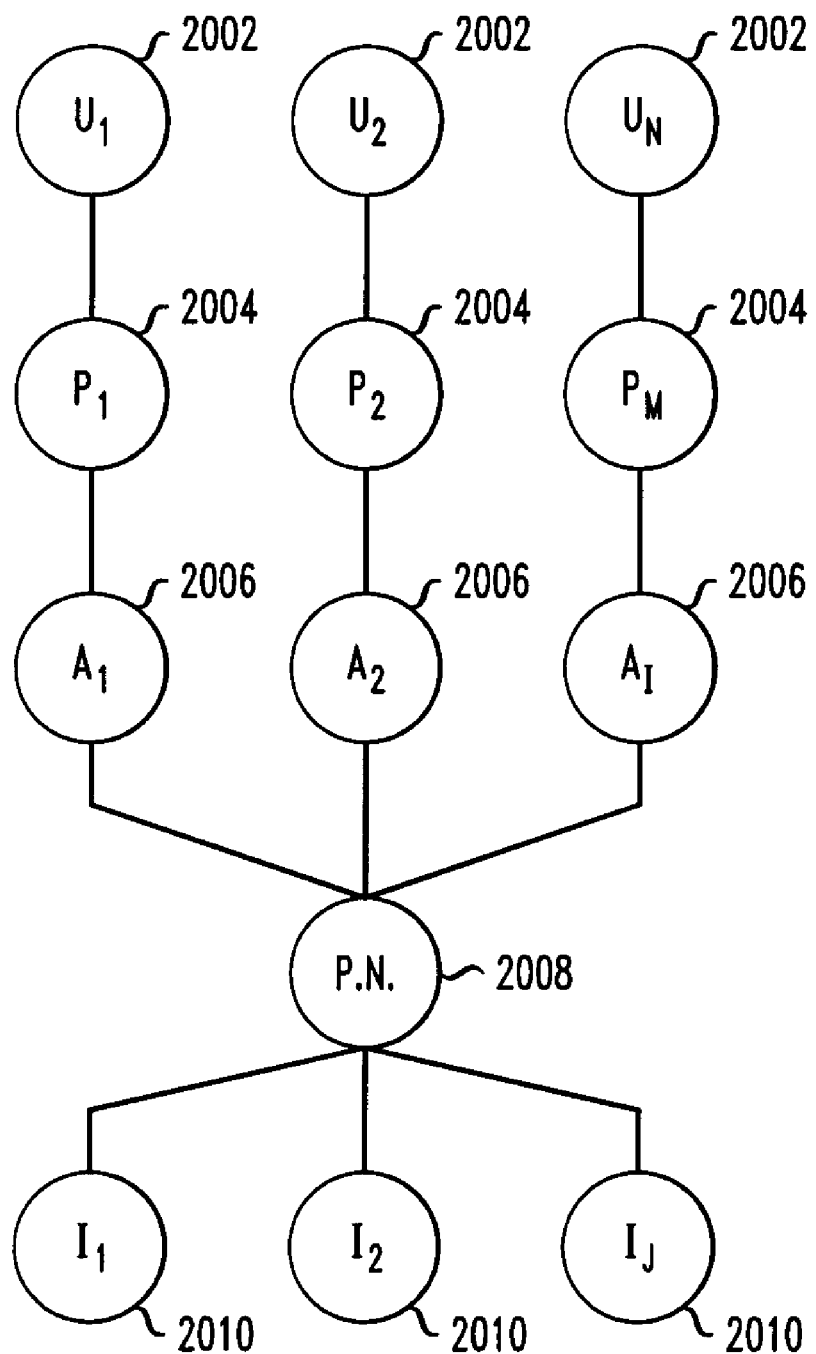
FIG. 3 depicts an exemplary inter-relationship between and among: (i) a payment network configured to facilitate transactions between multiple issuers and multiple acquirers, (ii) a plurality of users, (iii) a plurality of merchants, (iv) a plurality of acquirers, and (v) a plurality of issuers.

With reference to FIG. 3, an exemplary relationship among multiple entities is depicted. A number of different users 2002, $U_1, U_2 \ldots U_N$, interact with a number of different merchants 2004, $P_1, P_2 \ldots P_M$. Merchants 2004 interact with a number of different acquirers 2006, $A_1, A_2 \ldots A_I$. Acquirers 2006 interact with a number of different issuers 2010, $I_1, I_2 \ldots I_J$, through a single operator 2008 of a payment network configured to facilitate transactions between multiple issuers and multiple acquirers; for example, MasterCard International Incorporated, operator of the BANKNET® network, or Visa International Service Association, operator of the VISA-NET® network. In general, N, M, I, and J are integers that can be equal or not equal. FIG. 3 is presented to illustrate the kind of network with which one or more pre-paid payment cards are designed to function with. Users 2002 could include, e.g., transit system passengers. Merchants 2004 could include one or more transit systems.

One or more embodiments of the invention may have applicability in a number of scenarios, including, by way of example and not limitation, transit. Purely to present an example, one particular transit environment, in which one or more inventive techniques may be employed, will now be described with regard to FIGS. 4-6. It will be appreciated that transit applications present issues of access control, i.e., whether to let a person into the system, as well as payment, how much to charge the person, and how and when to do so. Typically, transaction timing is important in a transit environment, such that access determinations are advantageously made quickly (and any time-consuming calculations are preferably done after the event).

Figure 4:
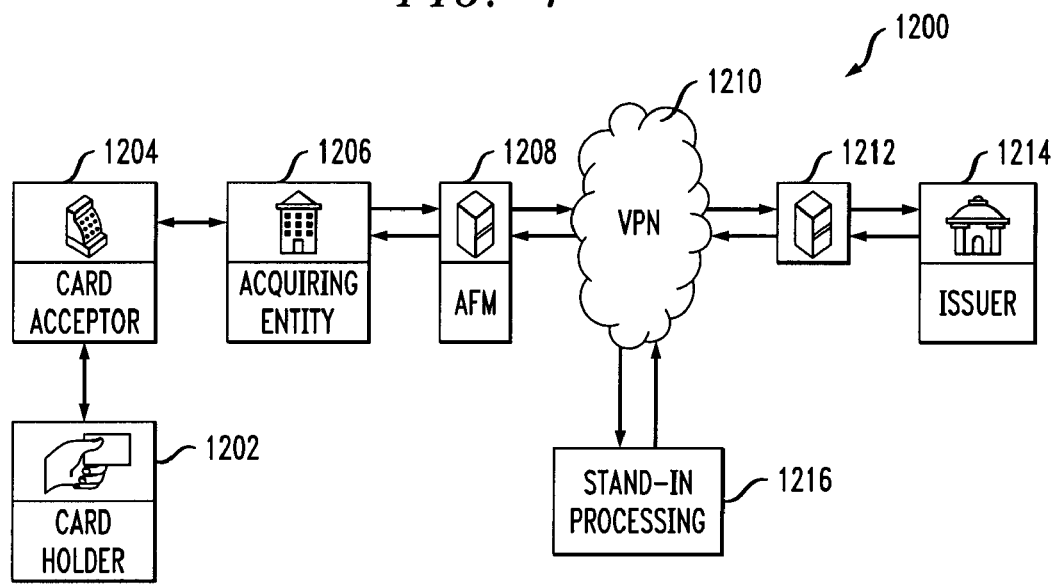
FIG. 4 shows initial and periodic authorization flow in a system that can implement techniques of the present invention.

Attention should now be given to FIG. 4, which is a block diagram 1200 of one possible specific exemplary system which can employ one or more techniques of the invention, also depicting (via the arrows) certain exemplary data flows. Note that elements 1202, 1204, 1206, 1210, and 1214 in FIGS. 4-6 generally correspond to elements 2002, 2004, 2006, 2008, and 2010, respectively, in FIG. 3. A request may originate from a merchant and/or acquiring entity (for example the bank holding the merchant's account), and may traverse the payment network (in this case a VPN 1210 to be discussed below) to the issuer. The issuer 1214 then sends a response (or a stand-in processor 1216 sends it on behalf of the issuer) back through the payment network, to the merchant and/or acquiring entity. The request and response may employ standard formats (although the contents are not necessarily "standard").

As shown at 1202, the holder of a card or other payment device interacts with a terminal at a facility of a card acceptor 1204, corresponding, e.g., to terminals and points of sale as described with respect to FIG. 1 or fare gates as described with respect to FIG. 2. The card acceptor sends transaction information to an acquiring entity 1206, for example, via a network such as described in FIG. 1. By way of example and not limitation, an acquiring entity could include an acquirer or other entity responsible for the acquired transaction, whether they are referred to in common use by artisans skilled in the electronic payment arts as an "acquirer" or an "acquiring processor," and the like (the acquiring entity can also be referred to as a consolidator). An active file manager (AFM) 1208 can be provided between acquiring entity 1206 and a telecommunications network such as VPN 1210 (which can be, for example, a payment processing network). The AFM 1208 can be located in a variety of places, e.g., at the acquiring entity's facility, and could be operated by, e.g., an acquirer. Further, AFM 1208 could reside on the same machine as a conventional front end communications processor such as a MASTERCARD INTERFACE PROCESSOR™ or MIP™ processor (trademarks of MasterCard International, Inc. of Purchase, N.Y.), or could reside on a separate machine interfacing with such a conventional front end processor, which then interfaced with network 1210. In summary, manager 1208 can be connected to network 1210 for authorization processing, but as noted, can be located in a variety of places. Interaction with issuer 1214 may not be at the same time as the payment device interacts with a terminal.

Another conventional front-end communications processor 1212, such as a MIP™ processor, can be located, e.g., at the facility of an issuer 1214 to provide access to the aforementioned VPN 1210. Of course, there may be a plurality of similarly-equipped issuer, and other, facilities.

Figure 5:
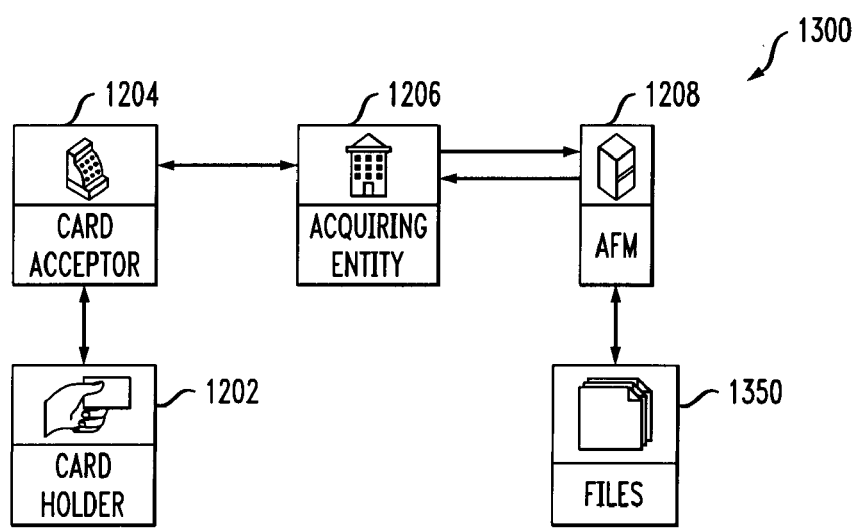
FIG. 5 shows file processing flow in a system that can implement techniques of the present invention.

FIG. 5 shows a block diagram 1300 of certain optional features of system 1200, which can be configured to implement a file processing flow. Items similar to those in FIG. 4 have received the same reference character and will not be described again. The arrows are for convenience in depicting the file processing flow. In block diagram 1300, Active File Manager 1208 is provided with an appropriate file structure 1350 (in some instances, structure 1350 may be a list or "constructed file"). In one or more embodiments, the AFM (Active File Manager) has an AFL (Active File List) that is a constructed file of both positive and negative accounts. That is, it is a list of all accounts active in the transit (or other) system, and potentially also drawing upon lists from other sources such as the International Hot Card Lists from MasterCard, Visa, and the like.

In one or more embodiments, access decisioning is carried out offline based on the indicator written to the card, as described elsewhere herein.

Front end processors, such as processor 212, and VPNs, such as VPN 210, are well-known to skilled artisans. In one specific example, the processor 212 is a MIP™ processor, and the VPN 210 is a telecommunications network providing MASTERCARD BANKNET® telecommunications network services (registered trademark of MasterCard International, Inc. of Purchase, N.Y.).

Examples will now be given of content of exemplary files in file structure 1350, which may be maintained on processor 1208 by a payment processing network operator; it is to be appreciated that these are exemplary in nature, and various implementations may include less than all the indicated parameters, and/or may include additional parameters not discussed here. Further, files may be combined or additional files may be employed as desired. Contents of an account range file may include, but are not limited to, one or more of a low range, a high range, a transaction-allowability indicating parameter indicating whether certain (e.g., transit system such as bus, subway, metro, underground) transactions are allowed, an authorization frequency in time units such as days, an authorization frequency in terms of number of transactions, and the like. The low range and high range might specify a range of account numbers eligible for a certain kind of transaction. For example, for sixteen digit account numbers, the eleven most significant digits of a lower limit on eligible account numbers and the eleven most significant digits of an upper range of eligible account numbers might be specified. The parameter indicating whether certain transactions were allowed could have, e.g., a simple yes or no value.

Still with regard to element 1350, in some instances, the AFM 1208 will "look" at a constructed file system (referred to as the "active file list" or "AFL") or a file that points to other files; that is, element 1350 could be such a constructed file system or file that points to other files. In this case, the other files could include a restricted card list (also known as "restricted control list" or "RCL") from a first payment association, such as MasterCard International Incorporated, of Purchase, N.Y., a "hot" card list (from, for example, a transit authority operating a transit system using one or more embodiments of the invention), a list of substantially all recent activity, the restricted card lists from other payment associations (for example, Visa International Service Association of San Francisco, Calif.), and the like. The so-called RCL of "hot" card lists may include, for example, cards believed to be lost, stolen, fraudulently used, and so on. By way of summary, in some instances, we may combine all the RCL lists (for example, MasterCard, Visa, transit authority) plus the list of active accounts together in one list.

In general terms, a single file or a constructed file or list available to the AFM may contain at least negative account status information for a number of accounts (the different RCLs, for example), and automatic approval may proceed only if an account number is not found on one of the RCLs. Appropriate file(s) or list(s) may, in some instances, be maintained in random access memory (RAM) for quick access.

An exemplary periodic (for example, nightly) batch file maintenance process will now be described. In terms of the account range file, the dedicated processor, such as 208, can receive a periodic update file, such as a nightly refresh file, from the payment processing network operator based on information from the issuer, and a full file replace (or alternatively application of the appropriate additions and/or deletes to the current file) can be performed on the dedicated processor. That is, a periodic update file may include a complete refresh, or directions to add and/or delete certain records in the file.

In certain environments, such as automated fare collection (AFC) in a transit system, transaction timing is quite significant. In many ordinary applications, timing is just an engineering or system requirement. However, transit applications, such as subway turnstile access, may have timing requirements on the order of, say, 300 ms. Typical credit card authorization times may run, for example, from 1000 ms up to 18 seconds. This is simply not acceptable, in order to get passengers rapidly through a turnstile or similar fare gate. Subway turnstiles are but one example of many transit applications, such as bus, subway, light and/or heavy rail, ferries, parking, and the like. It is currently believed that subway applications may have the most severe timing requirements.

One or more inventive embodiments may address the aforementioned issues by making a fast decision. The aforementioned AFM may function as a gateway to a payment processing network, such as the MasterCard Banknet® communications network, and may typically be resident on a merchant's or acquirer's premises—in one or more instances, the AFM may be a server that the operator of a payment network places on the merchant's or acquirer's premises to help facilitate such parties performing authorizations. As noted elsewhere herein, the AFM may have access to files or lists such as Restricted Card Lists (RCLs), a restricted list from a transit authority, and so on—such lists may include, for example, account numbers associated with fraudulently used, stolen, and/or lost cards, and the like. Advantageously, in one or more preferred inventive embodiments, the RCL and the like reside on the AFM and not in a terminal such as a turnstile.

Since, due at least in part to the large number of entries in typical RCLs (for example, about 800,000 to 1,500,000), requests for authorization may not be processed sufficiently quickly at the local terminal level, one or more inventive embodiments enable such authorization to be performed at a server (high-speed computer) level. In the exemplary context of access to a transit system, one can think of two separate aspects: (1) request for entry into the transit system (in some instances, as will be discussed further below, a request can proceed from the fare gate, routed through an inventive payment platform, to an AFM for quick decision making), and at a later time (2) payment approval and settlement mechanics will be performed. In some instances, one can also perform standard checks, such as checking the bank identification number (BIN) range for the issuer, performing the Luhn technique or Luhn formula, also known as the "modulus 10" or "mod 10" technique, which is a simple checksum formula used to validate a variety of identification numbers, such as credit card numbers and the like. It is known to the skilled artisan and is described, for example, in U.S. Pat. No. 2,950, 048. Other standard tests that can be performed include expiry date and a velocity check parameter. The latter may be a dynamic parameter set by a merchant, such as a transit system operator. For example, there may be a limit of X number of appearances of a particular PAN in the system, for example, 5 or 10 in one day. Such an approach limits the number of times that one can use that particular device in the system over a period of time.

In one or more embodiments, a high-speed telecommunications network, with a minimum speed of 768 kbps, can be employed, for example, from the turnstile (fare gate) to the server. The server may be resident, for example, on merchant (transit authority) premises, on an acquirer's premises, or housed in a facility of an operator of a payment card network (such as MasterCard International Incorporated) or a facility of a third party processor, and the server may be operated, for example, by the aforementioned operator of a payment card network 2008, or by a third party vendor. In one or more embodiments, the aforementioned server functionality may be embodied, for example, in the payment platform 704 (discussed with respect to FIG. 6). In general terms, the platform and AFM can physically reside anywhere; for example, the Transit Agency premises, premises of a Third Party Processor/AFM Integrator, or even on the Premises of the operator of a payment card network, such as MasterCard International Incorporated. It is, however, desirable that there are high speed connections between the terminal estate, the platform, the AFM, and payment processing system (such as MasterCard's BankNet® network or the like).

It should be mentioned that throughout this application, words such as "one" and "we" are not necessarily intended to imply human agency, but may refer also to steps done partially or entirely by computers or other automated techniques.

Figure 6:
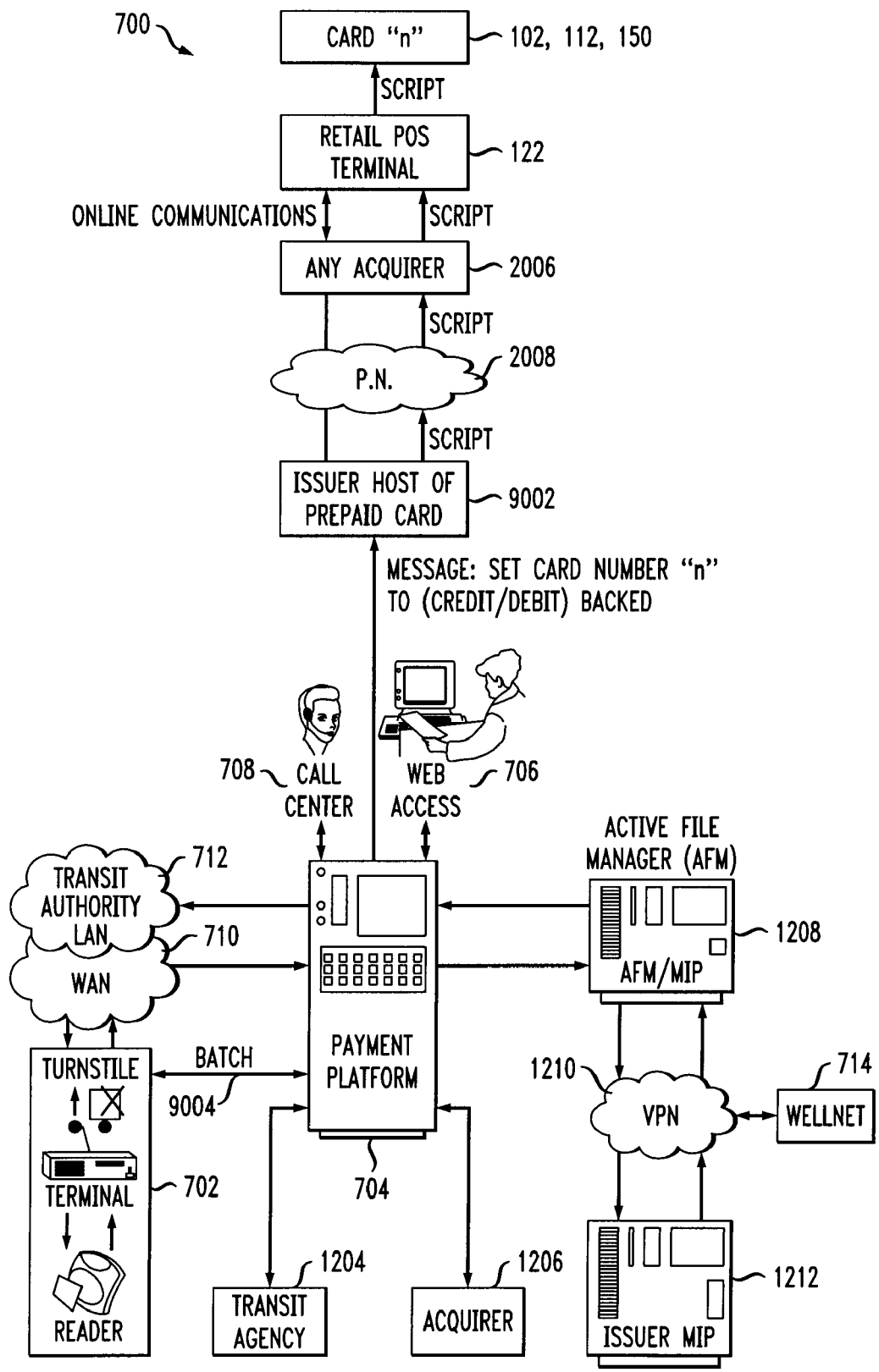
FIG. 6 is a system diagram of an exemplary transit solution that can implement techniques of the present invention.

Attention should now be given to FIG. 6, which depicts an exemplary detailed architecture for an exemplary AFC solution 700. The architecture is similar to that of FIGS. 4 and 5, but more detailed, and items similar to those in FIGS. 4 and 5 have received the same reference character. In general terms, three significant components of the system are the fare gate assembly (turnstile, reader and terminal) 702, payment platform 704, and AFM 1208. Platform 704 may optionally be in communication with assembly 702, for example, via WAN 710 and/or LAN 712. In presently preferred embodiments of the invention, communication is via batch mode, as shown at 9004. AFM 1208 may also be in communication with platform 704, over a high speed communications network, and the components may be cooperatively configured to carry out one or more method steps disclosed herein. In one or more embodiments, the connection between AFM 1208 and platform 704 can be accomplished via a gigabit LAN connection.

AFM 1208 functions as a decision maker, going through appropriate criteria and performing a check for people attempting to access the transit system. Platform 704 functions as a record keeper, gathering records of ridership; keeping records of accounts; performing reconciliations and other accounting functions; updating account balances based on activity; facilitating registration; and so on. Platform 704 may also handle web access 706 and assist customer representatives in call center 708.

As noted elsewhere, in one or more embodiments, access decisioning is carried out offline between the card and fare gate 702, based on the indicator written to the card, as described elsewhere herein.

In the classic merchant card processing scenario, the merchant's (transit agency in this example) acquirer processes all of the card transactions for the merchant. There are three steps to handling a card transaction: authorization, clearing and settlement. The acquirer typically routes each of these transactions to the respective card association, that is, Visa, American Express, MasterCard, Discover and so on.

As noted, three significant components of system 700 include the terminal 702, the platform 704 and the AFM 1208. Given the size of a transit agency's terminal estate (may vary, for example, from 100-5000), and the correspondingly large number of individual rider transactions, records of this activity are typically communicated from one component to another in regularly scheduled batch transmissions. However, based on the amount of time that passes in between each batch, the information upon which the AFM bases its decision may be delayed, or otherwise stale. Thus, in one or more embodiments, the system 700 is designed to manage the flow of information across an open communication channel so that each component 702, 704, 1208 is updated on an as-near real time basis as permissible, given the volume of communications that occur in any given time sequence, based on pre-established QoS (Quality of Service) prioritization. Typically in ordinary credit card processing systems, updates to the RCL are done every 4 hours or so. In AFC systems, updates may typically be done periodically in batch mode. Terminals 702 may communicate to the host server 704 in batch, and the host server may perform authorizations in batch. One or more embodiments of inventive systems work on the real-time exchange of information. As the transactions occur, the systems share that information over open interfaces and update each other real-time per QoS (Quality of Service) prioritization. In one or more embodiments, the AFM 1208, platform 704, and terminals 702 all update themselves on a real-time basis. In general terms, data and/or file transfers can occur in batch and in real time based on QoS prioritizations; some transfers may occur as soon as possible, typically within seconds or minutes (this may be thought of, in some embodiments, as "near-real-time" functionality). The skilled artisan is familiar with real time updates employing QoS prioritization and the like, and, given the teachings herein, will be able to implement same in the context of one or more embodiments of the invention.

Still referring to FIG. 6, assembly 702 is preferably connected to platform 704 via a wide area network (WAN) 710 and/or a local area network (LAN) 712, such as that of a transit authority. The platform 704 may support the fare gate (broadly understood to include subway turnstiles, bus fare boxes, and the like) and account transactions by maintaining account statuses and routing requests and responses for authorization. Among the tasks that may be managed by platform 704 are:

routing fare gate transaction activity between the transit agency reader/terminals and the AFM.

managing the necessary funding options for contactless device customers and their associated accounts.

hosting a transit agency-defined fare table and transfer rules (the fare rules may be defined by the transit agency, often as part of a public process, and the platform 704 typically does not change these rules; rather its function is to apply these rules to riders' accounts in the AAL) and applying these fare and transfer rules to riders' accounts—since fare rules reside here, calculations of complex fares, for example, depending on distance traveled or discounts, may be performed here.

preparing the information to facilitate clearing messages between transit agencies, their acquirers, and the operator of a payment card network, such as MasterCard International Incorporated.

receiving and managing the transit agency's Restricted Card List (RCL).

supporting customer service functionalities such as web site 706 and call center 708 interfaces.

"Well net" 714 is a monitoring and parameter management system for MIPs 1208, 1212.

Appropriate communications links may be provided between the platform 704 and the transit agency 1204 and acquirer 1206.

In one or more embodiments, the central server that performs various calculations is the payment platform 704 in FIG. 6. Payment platform 704 advantageously calculates fares, since this is typically where the fare rules reside. It should be noted that the preceding description is non-limiting, and the central server could be in other locations in other embodiments. In general, the central server can be anywhere in the system where with access to ridership records and connectivity to the VPN 1210, and preferably with access to any additional data needed to determine fares, such as, for example, personal entitlements and/or discounts and/or subsidies associated with the card. Under a different architecture, this could be the same system component that participates in the real time transaction (functionality of elements 704, 1208 could be combined in some instances).

By way of summary and provision of further detail, in many cases, a "transaction" using one or more inventive techniques will imply multiple (two or more) presentations of the card or other payment device, such as check-in and check-out, which determine the final fare. However, in some instances, only a single presentation is required, yet certain calculations (e.g., fare discount) may need to be performed to determine the amount due.

By way of review, when tapping out at an exit gate (for example), prior art techniques (such as TfL's Oyster card) require a high-speed real time calculation which works out how far the passenger has traveled, what fare rules apply, and how much to charge; then performs the actual charge, and then allows egress through the fare gate. One or more embodiments of the invention, however, defer such fare calculation to, for example, payment platform 704 in FIG. 6. In particular, the card is tapped; the resultant requests passes transparently through the payment platform 704 to the AFM 1208; AFM 1208 makes rapid, real time entrance and/or exit decisions. Thereafter, the payment platform 704 collects information re the tap history of the card, which is translated to a fare calculation. Advantageously, in one or more embodiments, steps that should happen in real time, when the card or other payment token (device) is tapped or otherwise presented to the terminal, are performed using AFM 1208, while steps that should happen after the event in a "back office" fashion are performed using payment platform 704. Payment platform 704 thus typically "knows" how much a card has paid and should pay.

One or more embodiments of the invention are applicable in a scenario wherein a person uses a pre-paid card within an infrastructure such that when a top-up transaction is required, the person is normally required to do something different than he or she would normally do (change in behavior). For example, the person might normally perform a simple "tap and go" transaction (i.e., present the card or other payment device in a contactless manner) to travel on a transit system, but when the time came that a top-up was required, the person needs to go to a different terminal and carry out a different type of transaction (e.g., contacted and on-line).

Advantageously, one or more embodiments of the invention may be employed within a public transport or transit environment 200. Embodiments of the invention are believed to be particularly useful in connection with cards or other payment devices that require different behavior for balance top-up. A non-limiting example is a public transport or transit environment of the kind using contactless payment devices for access, where such contactless payment devices require a contacted on-line transaction for balance top-up. Such contactless payment cards (for example, contactless payment cards 112, 212) are issued by banks, as opposed to proprietary and/or dedicated transit cards that are typically issued by transit agencies.

The EMV specification is a non-limiting example of the kind of situation just described. In a prepaid EMV-compliant card, when the counters on the card reflect all available funds, the card behaves in a manner similar to an electronic purse. The EMV specification was designed around credit and debit cards, wherein there is a source of funds, such as a bank account or a credit account, and the counters on the card reflect a subset of the available spending power. The purpose of the subset is to allow the card to transact offline, up to a certain point, and then require the card to conduct an online transaction, so that the counters can be reset, and to verify that there are no problems with the card, and that additional offline transactions are warranted.

As used herein, a "prepaid payment card" refers to a card or other device (e.g., appropriately configured cellular phone handset) configured according to a credit or debit card type payment system standard or specification (as opposed to a dedicated transit card or the like), wherein a stored balance associated with the card resides on a central or remote server, which prepaid payment card is designed for use in a conventional credit or debit card environment (for example, of the kind as shown in FIG. 3), and which is nearly universally accepted worldwide by merchants of all kinds. Such a card is also distinguished from a credit or debit card, in that it accesses a balance on a central server rather than a credit account or bank account. Furthermore, a debit card typically implies an established relationship with the cardholder (for example, an existing checking account) and is not anonymous, whereas a pre-paid card may (but need not be) purchased anonymously in a shop.

Transit cards typically are dedicated cards having a limited range of acceptance and are not widely accepted—they are typically accepted only by a single transit system in a single country, more typically in only a single city. In a few cases, transit cards may be accepted for low value purchases by a limited number of merchants that are connected with the transit system (e.g., vendors within the subway). The Hong Kong "Oyster" transit card can be used for low value purchases throughout the city but nowhere else. It is possible that evolving international standards may permit a transit card that can be used worldwide for transit, and possibly a small number of related low-value payments. In contradistinction, payment cards, such as prepaid payment cards employed in one or more embodiments of the invention, can typically be used worldwide and are near universally accepted by merchants of all kinds.

By way of additional background, the most common card-based forms of payment are general purpose cards, which are payment cards carrying logos that permit widespread usage of the cards within countries, regions or around the world. General purpose cards have different attributes depending on the type of accounts to which they are linked:

"pay later" cards, such as credit or charge cards, typically access a credit account that either requires payment of the full balance within a specified period (a charge card) or that permits the cardholder to carry a balance in a revolving credit account (a credit card);

"pay now" cards, such as debit cards, typically access a demand deposit or current account maintained by the cardholder; and "pay before" cards, such as prepaid or electronic purse cards, typically access a pool of value previously funded.

In one or more instances, it is desirable to facilitate use of prepaid payment cards in systems such as transit or transport systems. One manner to adapt EMV-compliant cards to implement prepaid card functionality is to exploit the EMV mechanisms by designating that the funding source is prepaid funds lodged in a "virtual" central account (for example, on a central host or the like). The central account is a "virtual" account in the sense that the user may not even realize that he or she has such an account; rather, it appears to the user that funds are simply loaded on the card and spent from the card.

In a current magnetic stripe approach (which may have particular applicability to the United States, although such an approach is not limited thereto), almost every transaction goes online and accesses the central (virtual) account. Using EMV, it is possible to reflect some or all of the available funds from the central account in the counters held on the card, such that the card can still be used as a prepaid card where all of the funds are guaranteed, but is not necessarily required to "go online" and access the virtual account for every transaction. This latter approach advantageously allows faster and cheaper transactions than in the case where every transaction must go online, and allows cards to be used in places where connectivity for "going online" is not readily available.

In an "extreme" example of the aforementioned latter approach, when someone pre-funds his or her account, the money goes into the central account; however, as soon as there is a dialog between the card and the central host, the entire amount of funds available is reflected in the counters on the card, and the amount in the central virtual account is set to zero. This means that it would actually be impossible to conduct an online transaction, as the amount in the central virtual account is now zero. In such a case, when a prepaid top-up ("load") is performed, the load must first go into the central virtual account and then be synchronized with the counters on the card. In current EMV approaches, this is only carried out using a contact-mode EMV transaction. This is so because of the long and unpredictable time required for the load and synchronization process; proceeding via a contactless interface is not allowed because of the high risk that the cardholder would remove the card before the transaction was complete.

Currently, typical transit-specific cards function as electronic purses (e-purses), and allow Internet-based top-ups. A holder might pay some funds from his or her credit or debit card into his or her transit account, and this information is then down-loaded into the transit infrastructure. The Internet top-up in this approach is seamless to the cardholder (traveler), who does not need to change his or her behavior in order for the top-up to be reflected in the balance on the card. When passing through the fare gate, in addition to allowing the passenger in, the system will conduct an additional transaction to increase the card balance.

Current EMV-based approaches do not permit such a seamless top-up, but rather force a contact-mode transaction with the payment card to be carried out, in order for the funds added to the central account during the Internet top-up to be reflected in the card counters. Contact mode transactions are typically not supported within the transit environment. One or more embodiments of the invention advantageously allow such a seamless top-up with a pre-paid payment card (for example, an EMV-based card), exploiting the contact-enabled and on-line capable retail payments infrastructure rather than the transit infrastructure which may be contact-less-only and offline.

Thus, one or more embodiments of the invention advantageously provide holders of a pre-paid payment card with a transit experience similar to holders of a pre-paid transit card. Note initially that if a person does not have a bank account or credit account, he or she is unable to carry out remote payment, and the only top-up mechanisms available to such person are either a face-to-face approach or a cash-accepting machine approach. In this limited case, the functionality is no different whether a pre-paid transit card or a pre-paid payment card is employed.

On the other hand, a rider who is capable of carrying out an Internet top-up must necessarily have a suitable method of payment; typically a credit or debit card. Normally, in current EMV-based approaches, money would be placed into the account, and then a contact EMV transaction would be required to reflect the added amount in the pre-paid payment card balance. In one or more embodiments of the invention, the first time a rider carries out a top-up, a contact EMV transaction is required, but at the same time, a suitable registration process is facilitated, at least insofar as obtaining details of a funding payment card (e.g., debit or credit card), and preferably name, address, and so on. In essence, this registration process (undertaken when the first top-up is carried out) constitutes the provision of data useful for risk management purposes. Once this data is available, the risk profile of the customer can be changed to reflect the fact that the person has an alternative payment source available (that is, whichever funding payment card the customer used to fund the top-up) and/or can be located in order to seek settlement of any outstanding debt. Note that previously, the person may have been known to the system merely as the holder of a (possibly anonymous) pre-paid card. In conclusion, for the avoidance of doubt, in one or more embodiments there are:

(i) a pre-paid payment card (or device) to be used for transit (which may be, for example, a dual interface device that accesses the transit system in a contactless manner but requires a contact transaction for top-up); and (ii) a funding account (for example, a funding card which can be any credit, debit, or other card account that can be used for a card-not-present transaction).

After the first top-up is carried out, in one or more embodiments, rather than merely reflecting the top-up in the card balance, additional material (an indicator) is written to the card during a transaction (which may be contacted), which indicates that although the card appears to be only a pre-paid card, it is in fact backed by the funding credit or debit card account for which the data has been obtained during the registration process. Such indicator can be sent using a suitable secure messaging channel; for example, by scripting using an EMV or similar script. In secure messaging, a message is received from a remote location, and its authenticity and integrity is cryptographically signed. EMV scripting is a secure issuer-controlled update of a card's operational parameters or configuration.

Accordingly, when presented at block 702 subsequent to both the first top-up and contacted transaction, the card informs the transit infrastructure that it is no longer necessary to treat the card as a pre-paid card; rather, the card can be treated as a token which accesses the credit or debit card account which was used to fund the top-up. Thus, in effect, when the customer taps (or otherwise presents) the pre-paid card, he or she is in essence presenting a secondary card accessing the funding account. Non-limiting examples of a funding account are a debit or credit card account.

Thus, in one or more embodiments, a first top-up is performed on line. A credit or debit card is registered in order to carry out this first top-up. A first contact EMV-transaction is then carried out, during which an indicator is sent down to the card (under control of the issuer of the prepaid payment card). This indicator changes some part of the personalization of the card, such that the card can now inform a reader in the transit infrastructure that the card no longer needs to be treated as a pre-paid card, but rather can be treated as a credit or debit card. In at least some instances, the card that is to be used in the transit system does not present the details of the credit or debit card to the reader; such details are presented in the back office. Rather, the card that is to be used in the transit system indicates to the reader that payment does not need to be taken from the card at that time; instead, it is simply necessary to record the details of the card, such that payment can be effectuated by the back office, in due time, using such details. This change of status of the card (downloading of the indicator) only needs to be carried out once. After the change in status of the card, wherein the indicator is loaded thereon to indicate that the card that is to be used in the transit system can be treated as a credit or debit card, contact EMV transactions are not necessary for further top-ups, inasmuch as central funds (from the account registered at registration) are being drawn upon, rather than funds carried in the on-card balance.

Consider, by way of example, use of a prepaid card or other prepaid payment device, with the aforementioned indicator (or similar functionality) present, employed in a transit system such as Transport for London (TfL), where fares are distance-based. In one or more embodiments, the prepaid card or other prepaid payment device functions in a manner similar to a credit (or debit) card. In a prepaid card not employing the indicator according to one or more embodiments of the invention, it might be desirable to process a transaction in real time for the actual amount. However, in one or more embodiments of the invention, based on the risk information, it is possible to simply monitor the behavior of the card that is to be used in the transit system over the course of the day, and at the end of the day (or other suitable period), post a payment against the account which backs the card that is to be used in the transit system. No direct payment (offline) processing is taken against the card that is to be used in the transit system itself. The payment platform 704 records entry into the system; where necessary, the payment platform 704 would also record exit from the system (in systems where the same is significant for fare determination). The card or other payment device and the terminal together make the immediate decision as to whether to allow access to (or exit from) the transit system. In an optional but preferred approach, a so-called "hotlist" or the like may be checked. The platform 704 or other central server periodically reviews the recorded transactions, figures out how much money is owed, and then processes that amount in the same manner as a conventional credit or debit card transaction.

It should be noted that use of a proprietary transit infrastructure would require adding capability to update the balances of the cards, with concomitant complexity and potential security exposure. EMV is designed so that "top ups" can only take place at online capable terminals, primarily for security reasons. In EMV, the issuer pre-configures certain parameters in the card and then sends the card out for offline spending. Once the card hits certain thresholds pre-programmed in by the issuer, the card will refuse to transact until an on-line transaction is carried out, wherein the issuer allows further off-line transactions or else forbids such further transactions. Allowing offline top-ups in EMV would be both a major change and a compromise in the security model.

On the other hand, one or more embodiments of the invention provide the advantage that, after performing the single contact transaction after the first top-up, no further special transactions are necessary. Another advantage of one or more embodiments arises from the fact that the card can now be treated as token for a debit or credit account, instead of a pre-paid card. This latter aspect obviates the need, with a prepaid card, for charging the exact fare in real time due to lack of follow-up opportunity. With backing by a credit or debit account, only recordation is required, due to the opportunity to seek payment from the registered debit or credit account in due time.

In one or more embodiments, a central balance is still maintained. There are several possible approaches. One possibility is auto top-up (preferably with opt-in by the customer), wherein the system merely tracks aggregated transit spend by the card that is to be used in the transit system, and when such aggregated transit spend hits a predetermined limit, a single payment for the aggregated amount is sought from the funding account. In a second alternative (for example, where the customer does not desire auto top-up), the system simply tracks spending against the card, and processes it against the funds which have been centrally lodged (in the top-up process) to offset the transit spend. In this latter approach, payment is sought from the registered account only at such time as the card exceptionally over-spends for transit (beyond the loaded amount). This is an approach to deal with the case where, because of the model, there is a risk of the card over-spending before the same can be prevented—funds can be recovered in the case of an exceptional over-spend, but there is not a routine automatic top-up of the card.

Thus, one or more embodiments of the invention address a potential issue of previous techniques using prepaid payment cards versus closed loop prepaid cards for applications such as transit. In particular, such potential issue might arise with prior systems because of limitations in carrying out remote (for example, Internet) top-ups of prepaid EMV cards (namely, requiring a contact POS transaction before the topped up funds are reflected in the on-card balance, and hence available for offline use).

Remote top-ups cannot be offered to customers whose only manner of payment is cash (because cash cannot be accepted remotely). In one or more embodiments, when accepting a card for remote payment, a name and address are obtained for verification purposes (in one or more embodiments, anonymous prepaid cards are not accepted to fund top-ups, at least not for initial top-ups). Remote top-up is therefore an opportunity to register not only a funding card account, but other risk mitigation data as well, for example, name, address, and so on. This data may be checked by a suitable Address Verification Service, where available. Remote top-up therefore represents an opportunity to transform the risk profile of a prepaid card by providing a fallback in the event of non-payment from the prepaid "account." In particular, in one or more embodiments, the card itself can be updated (for example, by loading the indicator via an EMV script) to inform terminals (including offline terminals) that the prepaid card is in fact "credit/debit card backed." In this way, then the card can now be treated, from a risk perspective, as a token accessing a credit or debit account rather than a prepaid card. This approach advantageously addresses potential issues versus Closed Loop (transit-specific) Prepaid cards, because cash customers will always have to be at a physical POS to do a top-up, in either approach, while Remote Top-up customers will only have to visit any online-capable physical POS once (following first registration) and thereafter the card is accepted just as if it were a credit or debit card.

It should be noted that in some prior art approaches, with value (rather than ticket) based closed-loop transit card schemes, an auto top-up feature is offered whereby when the balance of a pre-registered card drops below a certain amount (for example, $10) the next reader that it encounters will automatically increment the balance by a preset amount (for example, $40) and initiate, via the back office, the collection of the corresponding payment from a pre-registered payment card or account. These approaches are limited to dedicated closed-loop transit cards and require the customer to consent to recurring payments being taken automatically from his or her account. One or more embodiments of the invention function with prepaid payment cards and afford customers the choice of automatic recurring payments or customer-initiated recurring payments. Furthermore, one or more embodiments of the invention only require one "special interaction" with the card, while the traditional approach requires a special interaction at every top-up.

It should be noted that in most cases, the card will have a balance before the initial top-up.

Again considering FIG. 6, one manner in which the indicator can be written to the card is depicted therein. The user interacts with payment platform 704 (using, for example, call center 708 or web access 706) and registers for the service. This prompts payment platform 704 to send a message to the issuer host 9002 for the issuer of the particular prepaid card, indicating that the particular card (card "n" in this instance) has been registered and is backed by suitable risk mitigation; for example, a backing credit or debit account (or other risk mitigation data as discussed elsewhere herein). The person then uses the prepaid card in the normal manner at a retail point-of-sale terminal 122 (preferably a contact-type on-line capable terminal, and typically a pre-existing terminal outside the transit infrastructure), during which transaction, the issuer host 9002 sends a script containing the indicator over payment network 2008 via any acquirer 2006 to terminal 122, which writes same to the card "n" 102, 112, 150. This can be carried out during a normal online transaction with normal online communications. The script can be sent as part of the payload of the underlying transaction (this per se being a standard feature of EMV, which, given the teachings herein, the skilled artisan will be able to adapt to one or more embodiments of the invention). The issuer host may have a flag or other indicator set for card number "n" based on the message received from payment platform 704, such that it "knows" to send the script with the indicator when card "n" carries out a normal online transaction at a retail POS.

Figure 7:
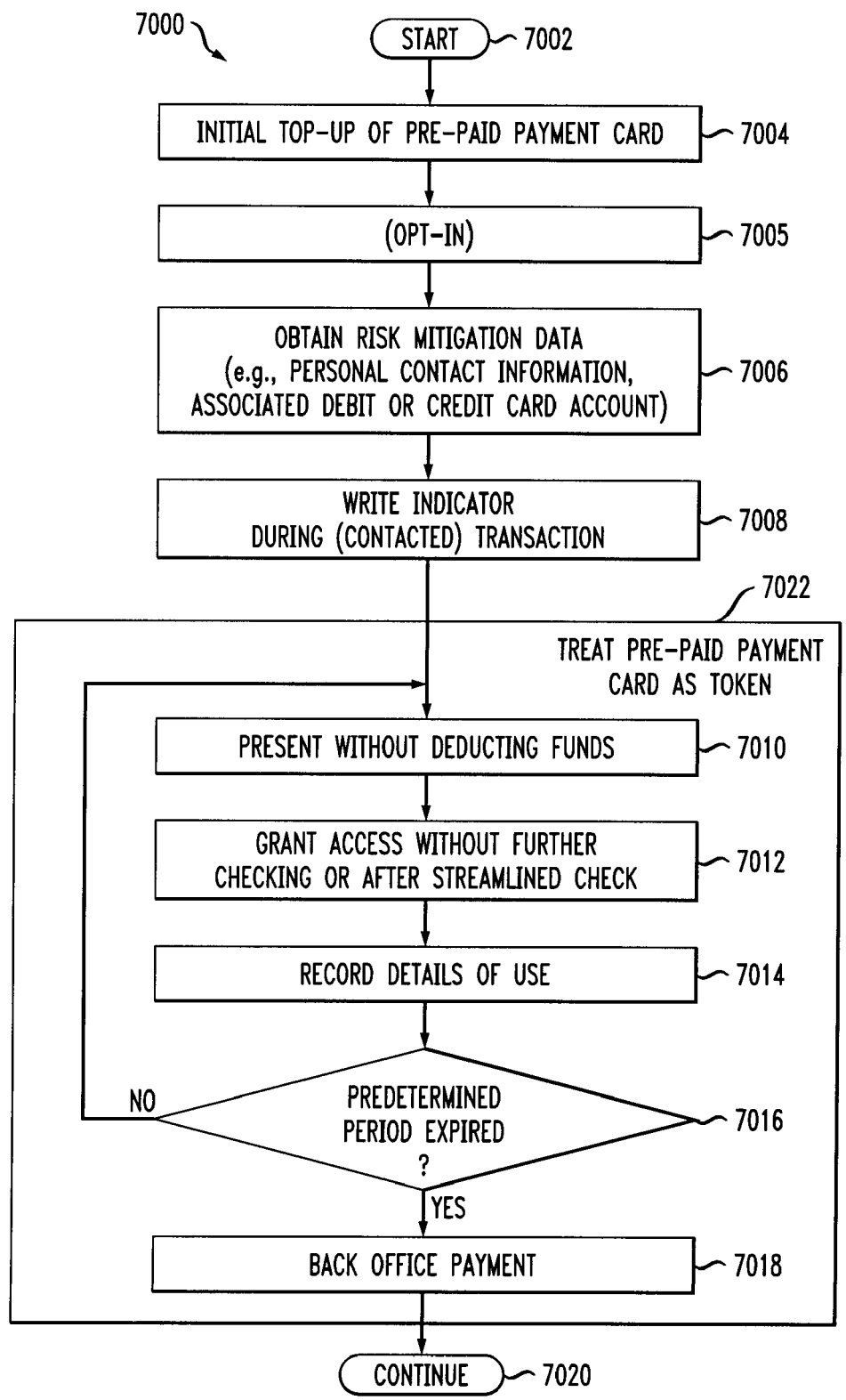
FIG. 7 is a flow chart of exemplary method steps.
Figure 8:
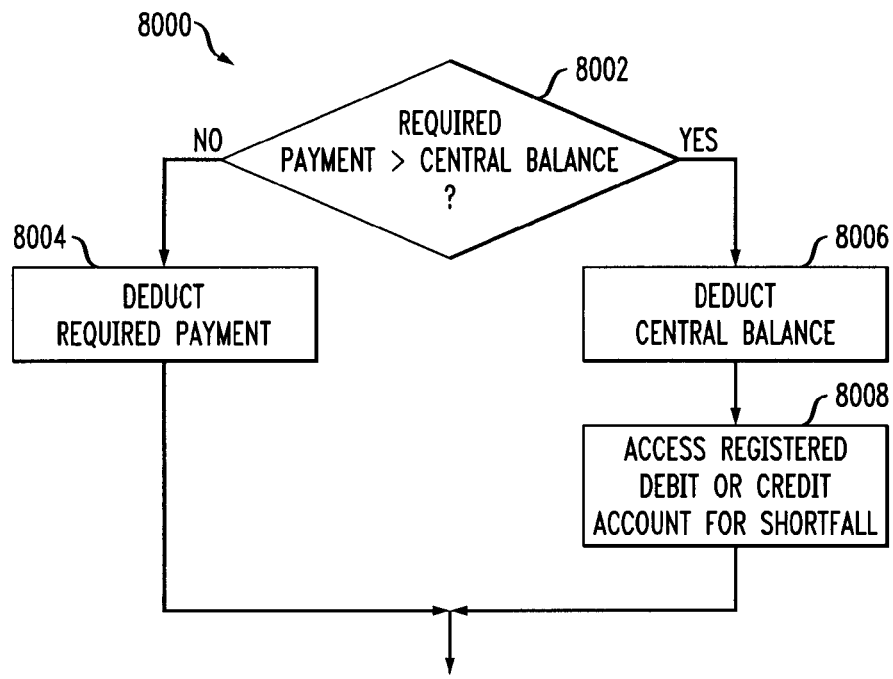
FIG. 8 shows optional details associated with the method of FIG. 7.

Attention should now be given to FIGS. 7 and 8, which depict an exemplary method 7000, according to an aspect of the invention, as well as optional details 8000. After beginning at block 7002, step 7004 includes facilitating a card holder (typically, but not necessarily, a transit system rider) carrying out an initial top-up of a balance of a pre-paid payment card. The prepaid payment card is configured such that it can be used in an infrastructure (for example a transit infrastructure including a subway, underground, or metro, buses, and the like; a parking meter system; a system of vending machines; and so on) in accordance with a payment specification requiring different behavior for normal transactions in the infrastructure and topping up of the balance (for example, requiring contacted transactions for topping up, as in EMV). Step 7004 could be carried out, for example, by having the card holder (e.g., transit system rider) access a central server (for example, payment platform 704 in the transit or other infrastructure) via the Internet (as indicated at "web access" 706 in FIG. 6) or telephone (as indicated by "call center" 708 in FIG. 6). Optional opt-in step 7005 will be discussed below. Contemporaneously with the initial top-up, step 7006 includes facilitating the card holder (e.g., rider) registering risk-management information in association with the pre-paid payment card. This step can also be carried out as described for step 7004. It is presently believed preferable that the risk-management information includes both the card holder's personal information and the details of a funding or "back-up" account, such as a credit card account or debit card account; however, in some instances, the risk-management information includes only personal contact information such as name, address (physical and/or e-mail), phone number, and the like When an account is registered, it "backs up" the pre-paid payment card, as described elsewhere herein. Additional risk mitigation data could include, for example, the billing name and billing address for the holder of the backing credit or debit card account, and so on. Where no back-up or funding account is registered, the personal contact information can be used to contact the rider in the case of overspending.

To summarize, a source of funds, such as a debit or credit card account, is required to carry out the initial top-up 7004. Risk mitigation data is obtained in step 7006. In the case where the person opts in to auto-top-up in step 7005, the risk mitigation data must include a source of funds for the auto top-up; typically, this might be the same source as for the initial top-up 7004, but in the general case, another source of funds could be used. In the case where the person does not opt in to auto-top-up, the risk mitigation data may or may not include a source of funds; if it does include a source of funds, such source may be the same as or different than the source used for initial top-up in step 7004.

Subsequent to the initial top-up, step 7008 includes facilitating writing an indicator to the pre-paid payment card during a transaction with the pre-paid payment card outside the infrastructure (for example, a contacted transaction). The indicator identifies the pre-paid payment card as having the associated risk-management information. The indicator may be, for example, under control of an issuer 1214 of the pre-paid payment card. Step 7008 can be carried out, for example, by card 112, 212 interacting with terminal 702, with writing of the indicator initiated by a central server (for example, an issuer host server 9002 of an issuer 2010 (located, for example, in a processing center such as 140, 142, 144)). Advantageously, in one or more embodiments, step 7008 can be carried out by any EMV-compliant online terminal without software or hardware changes (although this is but one non-limiting example). As used herein, "outside the infrastructure" includes, for example, in a separate retail infrastructure, as in FIG. 6, or in a separate transit activation station outside the normal transit terminal estate (in the latter case, the "infrastructure" includes the normal access terminals 702 of the transit system, which can be, for example, contactless terminals 124).

Step 7022 includes treating the pre-paid payment card as a token backed up by the risk mitigation information, during subsequent presentation of the pre-paid payment card to the infrastructure, based on presence of the indicator. This step can be carried out by the fare gate assembly 702 (or an analogous infrastructure terminal in other applications) interacting with the pre-paid payment card (since, in one or more embodiments, use of the pre-paid payment card for, e.g., transit access is offline). Processing continues at block 7020.

Note that the script which delivers the indicator is typically generated at the issuer host 9002 because an issuer key is typically required to generate it. Note also that a fare gate is a non-limiting example; other applications are possible—for example, the fare validation box of a bus or the like. Furthermore, although one preferred application of the invention is to transit systems such as subways, undergrounds, metros, buses, and the like, the invention is not limited to such applications, and may be employed in a number of scenarios; for example, parking meters, vending machines, and in any contactless-only environment where reader software can be modified to recognize the pre-paid payment card with the indicator thereon.

A "prepaid payment card" has been defined elsewhere herein as a card or other device (e.g., appropriately configured cellular phone handset) configured according to a credit or debit card type payment system standard or specification (as opposed to a dedicated transit card or the like), wherein a stored balance associated with the card resides on a central server, which prepaid payment card is designed for use in a conventional credit or debit card environment (for example, of the kind as shown in FIG. 3), and which is nearly universally accepted worldwide by merchants of all kinds. By way of review, and for the avoidance of doubt, one or more embodiments of the invention have particular applicability to such prepaid payment cards wherein spending and top-up require different customer behavior. Some embodiments may also be applicable to prepaid payment cards in the form of 'private label' cards which are, e.g., configured according to EMV but not bearing an international brand (e.g. the so-called "TaiwanMoney" electronic monetary card).

Again, by way of review and provision of further detail, the contacted transaction 7008 after the initial top-up 7004 is preferably carried out with a retail online-capable terminal 122, although, the transit agency could provide a separate "activation station" (an online-capable terminal within the transit system, typically separate from the turnstile and provided especially for carrying out the contacted transaction during which the indicator is written).

It should also be noted that one or more embodiments of the invention are applicable to many different kinds of transit fare structures, whether fixed or distance based. However, risk management in accordance with one or more embodiments of the invention may be particularly beneficial in the distance-based fare scenario, due to the greater risk of overspending in such cases.

In at least some instances, the initial top-up 7004 is carried out using an Internet-based (or telephone-based) card-not-present transaction for the "Backup" credit or debit card account. As used herein, the Internet is defined as a global network of interconnected computers, enabling users to share information along multiple channels, via a system of interconnected computer networks that share data by packet switching using the standardized Internet Protocol Suite (transmission control protocol/Internet protocol, or TCP/IP).

There are a number of ways in which the pre-paid payment card can effectively be treated as a token. For example, step 7010 includes refraining from deducting funds directly from the pre-paid payment card upon subsequent (that is, after the initial top-up and contacted transaction with registration) presentation of the pre-paid payment card for access to the transit system. This step can be carried out by the card interacting with fare gate 702. Note that EMV allows taking a nominal payment directly from the card itself; however, in one or more embodiments, when treating the card as a token, the nominal payment is not taken from the card itself, but rather, a back office payment is processed in due course.

Step 7012, which can be carried out together with steps 7010, 7014 or independent thereof, includes granting access to the transit system, upon subsequent presentation of the pre-paid payment card, either without further checking (based on presence of the indicator), or after performing a reduced check; for example, a streamlined check of an access list. This step can be carried out by the card interacting with fare gate 702 (where the streamlined check is to be performed, preferably interacting with an appropriate access list, such as a constructed file, blacklist, etc., residing in the terminal of fare gate 702 or analogous elements in a bus or the like). Access can be granted, for example, by opening a fare gate (for example, allowing passage through a turnstile).

Step 7014 includes recording details of use of the pre-paid payment card for access to the transit system, for a predetermined period (for example, for a certain aggregation time period, such as daily, or for a predetermined number of transactions, and so on). This step is preferably carried out by a central server such as platform 704 obtaining data from terminals 702 in the transit systems terminal estate. Note that in a general case, the predetermined period could even be a single trip (or other single transaction); that is, one payment per trip could be processed without any aggregation. As shown at decision block 7016, if the predetermined period has not expired ("NO" branch), flow control loops back to prior to step 7010, while if such period has expired ("YES" branch), step 7018 is carried out, as discussed below. The logic in block 7016 can also be implemented within a central server, such as platform 704. Step 7018 includes effectuating back-office payment for the access to the transit system with the pre-paid payment card for the predetermined period. This step can be carried out, for example, by the central server (such as platform 704); in some cases, interacting with acquirer 1206 and issuer 1212 over the payment network such as VPN 1210. For example, in some cases, step 7018 includes (preferably automatically) obtaining payment (commensurate with use of the transit system during the predetermined period) from the "backing" debit or credit card account upon expiration of the predetermined period. This approach is preferably set up by having the rider opt-in, in step 7005. In this approach, the central server, such as platform 704, simply conducts an conventional credit or debit card transaction with the issuer of the "backing" debit or credit card account, for the amount owed, using a conventional authorization request, authorization response, clearing and settlement as is ordinarily done in a system such as shown in FIG. 3.

In an alternative approach (an example 8000 of which is shown in FIG. 8), step 7018 includes debiting a central balance associated with the pre-paid payment card, as per step 8004. Since there may be times (where the rider has not opted-in to automatic top-up, for example), wherein the central balance is inadequate, appropriate logic is preferably provided to address such situations. A non-limiting example of such logic is shown in FIG. 8. In particular, step 7018 could include executing decision block 8002, to determine whether the required payment for usage of the transit system during the predetermined period is greater than the available central balance (such balance residing, for example, on a central server such as platform 704). If such is not the case, as per the "NO" branch, the required payment can simply be deducted from the central balance, as per step 8004. However, if the required payment is greater than the central balance, as per the "YES" branch, the entire central balance can be deducted, as per step 8006, and then access can be had to the registered (backing or backup) credit or debit card account (or other backup funding account) to effectuate the payment (for example, to make up the difference when the central balance is non-zero, but inadequate for the entire amount owed)(or if, for example, only personal contact information was obtained for risk mitigation, the rider could be contacted to obtain the additional amount owed). The steps shown in FIG. 8 are preferably carried out by a central server, such as platform 704. Where step 8008 is required, it can be carried out by a central server, such as platform 704, simply conducting a conventional credit or debit card transaction with the issuer of the "backing" debit or credit card account, for the shortfall (which could be the whole amount if the central balance was zero), using a conventional authorization request, authorization response, clearing and settlement as is ordinarily done in a system such as shown in FIG. 3.

It should be noted that one or more embodiments of the invention relate to an environment where, when one presents (e.g., by tapping) the card or other payment device to gain access to the transit system, the ensuing transaction takes place entirely offline. Thus, under some circumstances, it may be desirable to perform a fare calculation in real time; to do this in the absence of communications (i.e., offline), any data needed for the calculation should reside on the card or other payment device.

System and Article of Manufacture Details

Figure 9:
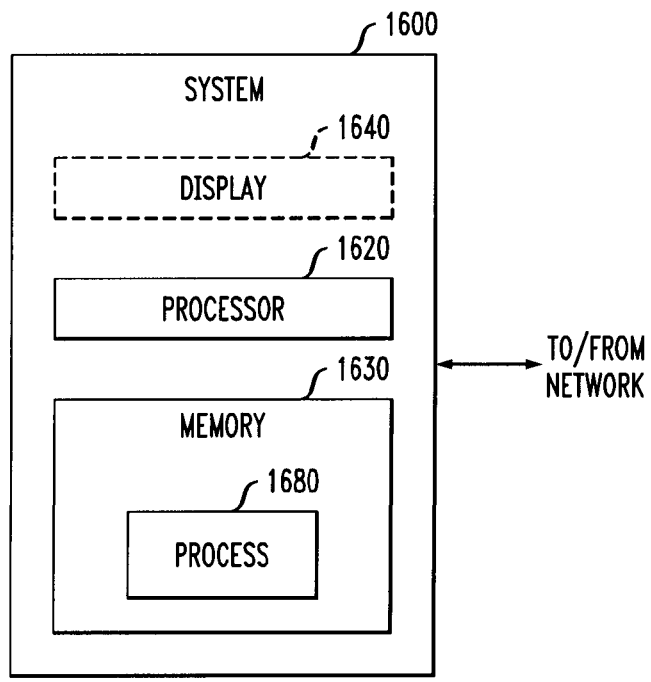
FIG. 9 is a block diagram of an exemplary computer system useful in one or more embodiments of the present invention.

The invention can employ hardware and/or software aspects. Software includes but is not limited to firmware, resident software, microcode, etc. Software might be employed, for example, in connection with one or more of a terminal 122, 124, 125, 126, 702, a front end processor 1208, 1212, an authorization subsystem located at a central location 1216, a processing center 140, 142, 144 (optionally with data warehouse 154) of a merchant, issuer, acquirer, processor, or payment processing network operator, and/or a platform 704. Firmware might be employed, for example, in connection with payment devices such as cards 102, 112, 212. FIG. 9 is a block diagram of a system 1600 that can implement part or all of one or more aspects or processes of the invention. As shown in FIG. 9, memory 1630 configures the processor 1620 (which could correspond, e.g., to processor portions 106, 116, 130, processors of elements 1208, 1212, 702, 704, processors of authorization subsystems such as that located at a central location 1216 or processors of remote hosts in centers 140, 142, 144) to implement one or more aspects of the methods, steps, and functions disclosed herein (collectively, shown as process 1680 in FIG. 9). Different method steps can be performed by different processors. The memory 1630 could be distributed or local and the processor 1620 could be distributed or singular. The memory 1630 could be implemented as an electrical, magnetic or optical memory, or any combination of these or other types of storage devices (including memory portions as described above with respect to cards 102, 112, 212). It should be noted that if distributed processors are employed, each distributed processor that makes up processor 1620 generally contains its own addressable memory space. It should also be noted that some or all of computer system 1600 can be incorporated into an application-specific or general-use integrated circuit. For example, one or more method steps could be implemented in hardware in an ASIC rather than using firmware. Display 1640 is representative of a variety of possible input/output devices.

As is known in the art, part or all of one or more aspects of the methods and apparatus discussed herein may be distributed as an article of manufacture that itself comprises a tangible computer readable recordable storage medium having computer readable code means embodied thereon. The computer readable program code means is operable, in conjunction with a computer system, to carry out all or some of the steps to perform the methods or create the apparatuses discussed herein. A computer-usable medium may, in general, be a recordable medium (e.g., floppy disks, hard drives, compact disks, EEPROMs, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk. The medium can be distributed on multiple physical devices (or over multiple networks). For example, one device could be a physical memory media associated with a terminal and another device could be a physical memory media associated with a processing center. As used herein, a tangible computer-readable recordable storage medium is intended to encompass a recordable medium, examples of which are set forth above, but is not intended to encompass a transmission medium or disembodied signal.

The computer systems and servers described herein each contain a memory that will configure associated processors to implement the methods, steps, and functions disclosed herein. Such methods, steps, and functions can be carried out, e.g., by processing capability on elements 102, 112, 122, 124, 125, 126, 140, 142, 144, 1208, 1212, 1216, 702, 704, or by any combination of the foregoing. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

Thus, elements of one or more embodiments of the present invention, such as, for example, the aforementioned terminals 122, 124, 125, 126, 702, processing centers 140, 142, 144 with data warehouse 154, processors 1208, 1212, 704, processors of authorization subsystems such as that located at a central location 1216, or payment devices such as cards 102, 112, 212 can make use of computer technology with appropriate instructions to implement method steps described herein. By way of further example, a terminal apparatus 122, 124, 125, 126, 702 could include, inter alia, a communications module, an antenna coupled to the communications module, a memory, and at least one processor coupled to the memory and the communications module and operative to interrogate a contactless payment device (in lieu of, or in addition to, the antenna and communications module, appropriate contacts and other elements could be provided to interrogate a contact payment device such as a contact card or read a magnetic stripe). By way of yet a further example, an active file manager apparatus for processing an active file in a payment system, could include a memory, and at least one processor coupled to the memory. The processor can be operative to perform one or more method steps described herein, or otherwise facilitate their performance.

Accordingly, it will be appreciated that one or more embodiments of the present invention can include a computer program comprising computer program code means adapted to perform one or all of the steps of any methods or claims set forth herein when such program is run on a computer, and that such program may be embodied on a computer readable medium. Further, one or more embodiments of the present invention can include a computer comprising code adapted to cause the computer to carry out one or more steps of methods or claims set forth herein, together with one or more apparatus elements or features as depicted and described herein.

As used herein, including the claims, a "server" includes a physical data processing system (for example, system 1600 as shown in FIG. 9) running a server program. It will be understood that such a physical server may or may not include a display, keyboard, or other input/output components.

Furthermore, it should be noted that any of the methods described herein can include an additional step of providing a system comprising distinct software modules embodied on one or more tangible computer readable storage media. All the modules (or any subset thereof) can be on the same medium, or each can be on a different medium, for example. The modules can include any or all of the components shown in the figures. In one or more embodiments, the modules include a payment platform module (for example, running on one or more hardware processors of an infrastructure server, such as 704), an issuer module (for example, running on one or more hardware processors of issuer host 9002), and an infrastructure terminal module (for example, running on one or more hardware processors of an infrastructure terminal such as the terminal of fare gate 702). The method steps can then be carried out using the distinct software modules of the system, as described above, executing on the one or more hardware processors. Further, a computer program product can include a tangible computer-readable recordable storage medium with code adapted to be executed to carry out one or more method steps described herein, including the provision of the system with the distinct software modules. In some embodiments, payment platform 704 is realized as the payment platform module executing on a central server of the transit (or other) infrastructure; and AFM 1208 is realized as an active file manager module executing in association with a front end communication processor (i.e., on such a front end communication processor or on another computer coupled thereto).

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for enhancing the functionality of a pre-paid payment card configured for use in an infrastructure in accordance with a payment specification requiring different procedures for normal transactions using said pre-paid payment card in the infrastructure versus that required for topping-up of a balance associated with said prep-paid payment card, comprising the steps of:
registering risk mitigation information in association with said pre-paid payment card contemporaneously with an initial top-up of the pre-paid payment card;

subsequent to said initial top-up and registration of the risk mitigation information, conducting an online transaction with said pre-paid payment card outside said infrastructure;

downloading an indicator to an electronic memory of the pre-paid payment card while conducting the online transaction, the indicator identifying the pre-paid card as having said risk mitigation information associated therewith;

presenting said pre-paid payment card to a reader within said infrastructure, and conducting an offline transaction based upon detection by the reader of the indicator in the electronic memory of the pre-paid payment card.

2. The method of claim 1, wherein:
said infrastructure comprises normal access terminals of a transit system, said normal access terminals including contactless readers;
further including conducting a contacted transaction to effect the initial top-up,
presenting the pre-paid payment card to one of the contactless readers, and
gaining access to the transit system based upon detection of the indicator by the reader.

3. The method of claim 2, wherein said risk mitigation information comprises personal contact information.

4. The method of claim 2, wherein said risk mitigation information comprises a backup funding source.

5. The method of claim 4, wherein said backup funding source comprises one of a credit card account and a debit card account accessible via a payment processing network.

6. The method of claim 1, wherein said initial top-up is carried out using a card-not-present transaction for said one of a credit card account and a debit card account.

7. The method of claim 2, wherein said offline transaction includes gaining access to the transit system without deducting funds directly from said pre-paid payment card.

8. The method of claim 7, further including the step of effectuating back-office payment by debiting a central balance associated with said pre-paid payment card.

9. The method of claim 7, wherein said risk mitigation information comprises a backup funding source and further including effectuating back-office payment by accessing said backup funding source.

10. The method of claim 8, wherein said step of effectuating said back-office payment is conducted upon expiration of a predetermined period.

11. The method of claim 7, further comprising effecting payment from a backup funding source upon expiration of a predetermined period.

12. The method of claim 7, wherein said offline transaction includes offline decisioning based on presence of said indicator, with one of:
no further checking; and
reduced checking, as compared to checking carried out for cards not having said indicator.

13. The method of claim 12, wherein said gaining of said access comprises opening a fare gate.

14. The method of claim 10, wherein said predetermined period comprises a predetermined number of transactions.

15. The method of claim 14, wherein said predetermined number of transactions is one.

16. The method of claim 14, wherein said predetermined number of transactions is greater than one.

17. The method of claim 10, wherein said predetermined period comprises a predetermined aggregation time period.

18. The method of claim 2, wherein said indicator is under control of an issuer of said pre-paid payment card, wherein the step of downloading the indicator further comprises downloading content of a transmission from the issuer over a payment network.

19. The method of claim 18, wherein, in said step of downloading the indicator is effected at a pre-existing retail point of sale terminal outside of said transit system.

20. The method of claim 2, further comprising the additional step of:
providing a system, wherein said system comprises distinct software modules, each of said distinct software modules being embodied on at least one tangible computer-readable recordable storage medium, and wherein said distinct software modules comprise a payment platform module, an issuer module, and an infrastructure terminal module;
wherein:
said step of registering said risk mitigation information contemporaneously with the initial top-up is carried out by said payment platform module executing upon said at least one infrastructure server;
said step of downloading said indicator to said pre-paid payment card during said transaction outside said infrastructure is carried out by said issuer module executing on an issuer host; and
said step of conducting the offline transaction is carried out by said infrastructure terminal module executing on at least one infrastructure terminal.

21. An apparatus comprising:
means for effecting an initial top-up of a balance of a pre-paid payment card, said prepaid payment card being configured for use in an infrastructure in accordance with a payment specification requiring different procedures for normal transactions in said infrastructure versus that required for topping-up of said balance;
means for, contemporaneously with said initial top-up, effecting registration of risk mitigation information in association with said pre-paid payment card;
means for, subsequent to said initial top-up, writing an indicator to said pre-paid payment card during an online transaction with said pre-paid payment card outside said infrastructure, said indicator identifying said pre-paid payment card as having said risk mitigation information associated therewith; and
means for, during subsequent presentation of said pre-paid payment card to said infrastructure, processing said pre-paid payment card offline as a token backed up by said risk mitigation information, based on presence of said indicator on said pre-paid payment card.

22. An apparatus comprising:
a memory; and
at least one processor, coupled to said memory, and operative to:
effect an initial top-up of a balance of a pre-paid payment card, said prepaid payment card being configured for use in an infrastructure in accordance with a payment specification requiring different procedures for normal transactions in said infrastructure versus that required for topping-up of said balance;
contemporaneously with said initial top-up, effect registration of risk mitigation information in association with said pre-paid payment card;
subsequent to said initial top-up, write an indicator to said pre-paid payment card during an online transaction with said pre-paid payment card outside said infrastructure, said indicator identifying said pre-paid payment card as having said risk mitigation information associated therewith; and during subsequent presentation of said pre-paid payment card to said infrastructure, process said pre-paid payment card as a token backed up by said risk mitigation information, based on presence of said indicator on said pre-paid payment card.

23. The apparatus of claim 22, wherein said at least one processor comprises a first processor, a second processor, and a third processor, further comprising:

distinct software modules, each of said distinct software modules being embodied on at least one tangible computer-readable recordable storage medium, and wherein said distinct software modules comprise a payment platform module, an issuer module, and an infrastructure terminal module;

wherein:

said first processor is operative to effect said initial top-up of said balance of said pre-paid payment card by executing said payment platform module;

said first processor is operative to effect registration of said risk mitigation information by executing said payment platform module;

said second processor is operative to write said indicator to said pre-paid payment card during said online transaction outside said infrastructure by executing said issuer module; and said third processor is operative to process said prepaid payment card offline as a token by executing said infrastructure terminal module.

24. A computer program product comprising at least one tangible computer readable recordable storage medium including computer usable program code, said computer program product including:

computer usable program code for enabling a card holder to carry out an initial top-up of a balance of a pre-paid payment card, said prepaid payment card being configured for use in an infrastructure in accordance with a payment specification requiring different procedures for normal transactions in said infrastructure versus that required for topping-up of said balance;

computer usable program code for, contemporaneously with said initial top-up, enabling said card holder to register risk mitigation information in association with said pre-paid payment card;

computer usable program code for, subsequent to said initial top-up, writing an indicator to said pre-paid payment card during an online transaction with said pre-paid payment card outside said infrastructure, said indicator identifying said pre-paid payment card as having said risk mitigation information associated therewith; and computer usable program code for, during subsequent presentation of said pre-paid payment card to said infrastructure, processing said pre-paid payment card as a token backed up by said risk mitigation information, based on presence of said indicator on said pre-paid payment card.

25. The computer program product of claim 24, wherein said computer program product comprises distinct software modules, each of said distinct software modules being embodied on said at least one tangible computer-readable recordable storage medium, and wherein said distinct software modules comprise a payment platform module, an issuer module, and an infrastructure terminal module;

wherein:

said payment platform module comprises:

said computer usable program code for, contemporaneously with said initial top-up, enabling said card holder to register said risk mitigation information in association with said pre-paid payment card;

said payment platform module being configured to execute upon an infrastructure server;

said issuer module comprises said computer usable program code for, subsequent to said initial top-up, writing said indicator to said pre-paid payment card during said online transaction with said pre-paid payment card outside said infrastructure, said issuer module being configured to execute upon an issuer host; and said infrastructure terminal module comprises said computer usable program code for, during subsequent presentation of said pre-paid payment card to said infrastructure, processing said pre-paid payment card as said token backed up by said risk mitigation information, based on said presence of said indicator on said pre-paid payment card, said infrastructure terminal module being configured to execute on at least one infrastructure terminal.

26. A system comprising:

an infrastructure comprising one or more first terminals including contactless readers;

a pre-paid payment card configured for use in the infrastructure in accordance with a payment specification requiring different procedures for normal transactions using the pre-paid payment card versus that required for topping-up of a card balance;

a central server storing the card balance;

a payment platform configured for registration of risk mitigation information relating to the holder of the pre-paid payment card;

a second terminal outside the infrastructure configured to facilitate online contact transactions with the pre-paid payment card;

an issuer host server configured to communicate with the second terminal and the payment platform, the issuer host server being further configured to initiate writing an indicator reflecting registration of the risk mitigation information at the payment platform to the pre-paid payment card during a transaction with the second terminal;

the one or more first terminals being configured to read the pre-paid payment card, process the pre-paid payment card as a token if it includes the indicator, and to make an offline decision to allow a transaction with the pre-paid payment card based at least in part on the presence of the indicator.

27. The system of claim 26, wherein the pre-paid payment card is EMV compliant, the payment specification requires a contact transaction for top-up and contactless normal transactions, and wherein the payment platform is further configured to process card-not-present top-up of the card balance in the central server contemporaneously with registration of risk mitigation information.

28. The system of claim 27, wherein the risk mitigation information comprises a backup account accessible via a payment network.

29. The system of claim 26, wherein the one or more first terminals are configured to process the pre-paid payment card as a token by:

refraining from deducting funds directly from the pre-paid payment card upon making the offline decision to allow the transaction;

recording details of use of said pre-paid payment card, including use of said pre-paid payment card during the transaction, for a predetermined period, and effectuating back-office payment via said backup account for said predetermined period.

30. A method for enhancing the functionality of a pre-paid payment card configured for use in an infrastructure in accordance with a payment specification requiring a contactless procedure for normal transactions at a terminal within the infrastructure and an online contact transaction for top-up of the pre-paid payment card, comprising:

topping up a balance stored on a central server associated with the pre-paid payment card during an online contact transaction;

contemporaneously with topping up the balance of the pre-paid payment card, registering a backup payment account in association with the pre-paid payment card;

conducting a contact transaction outside the infrastructure following the registration of the backup payment account during which an indicator transmitted by an issuer host is downloaded onto an electronic memory within the pre-paid payment card, conducting a contactless transaction in the infrastructure using the pre-paid payment card following downloading of the indicator onto the electronic memory of the pre-paid payment card, causing details of the transaction to be recorded within the infrastructure without effecting immediate payment for the contactless transaction and offline allowance of the contactless transaction based at least in part on the presence of the indicator.

31. The method of claim 30, wherein the pre-paid payment card is an EMV compliant card.

32. The method of claim 30, further including the step of effecting payment from the backup account following a predetermined period after the contactless transaction.

33. The method of claim 30, further including the step of accepting funds into the central server during the online top-up transaction.

34. The method of claim 30, further including the step of opening a fare gate responsive to said offline allowance.

* * * * *